J. FLAMMANG.
MACHINE FOR MANUFACTURING PISTON RINGS.
APPLICATION FILED OCT. 7, 1919.

1,429,417.

Patented Sept. 19, 1922.
17 SHEETS—SHEET 4.

J. FLAMMANG.
MACHINE FOR MANUFACTURING PISTON RINGS.
APPLICATION FILED OCT. 7, 1919.

1,429,417.

Patented Sept. 19, 1922.
17 SHEETS—SHEET 5.

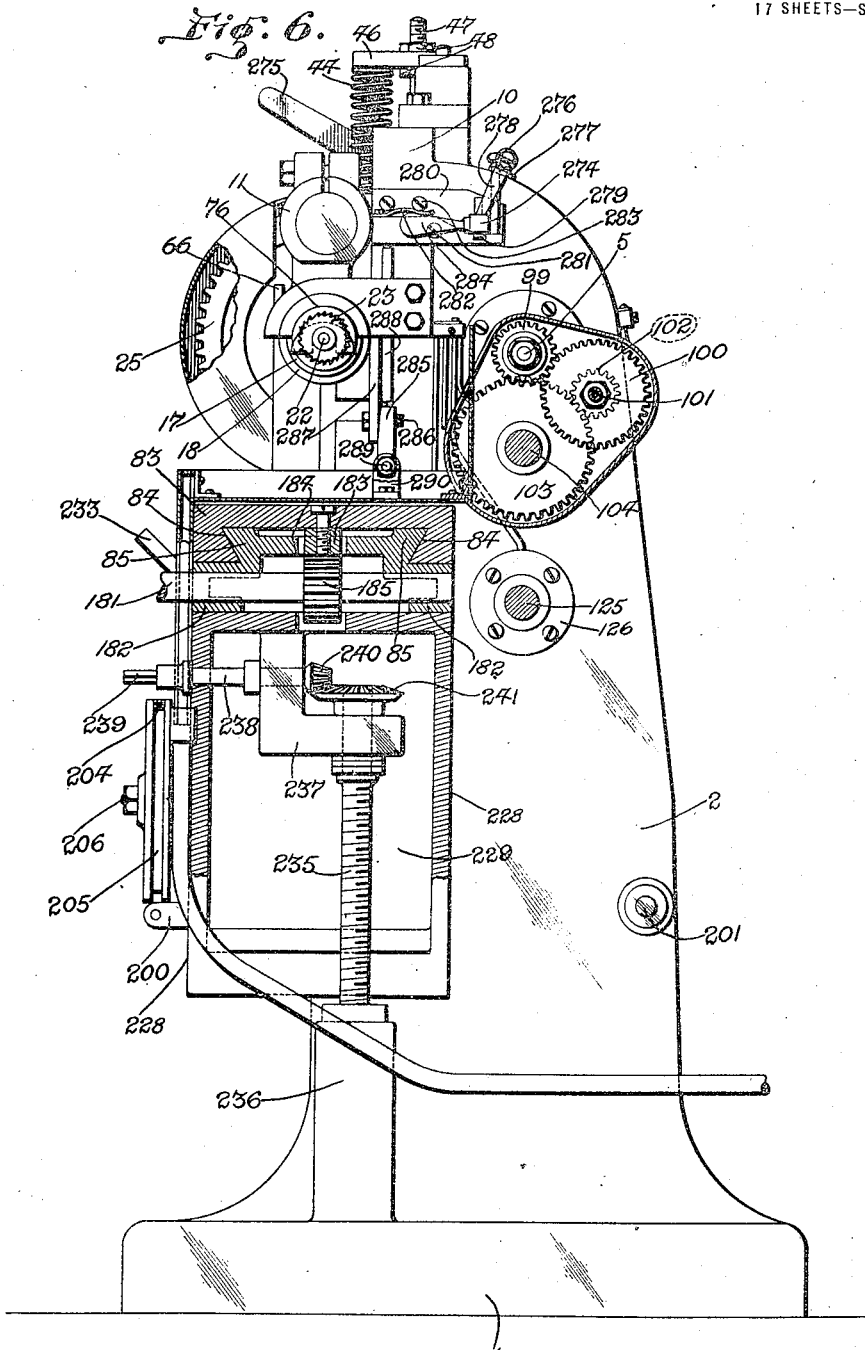

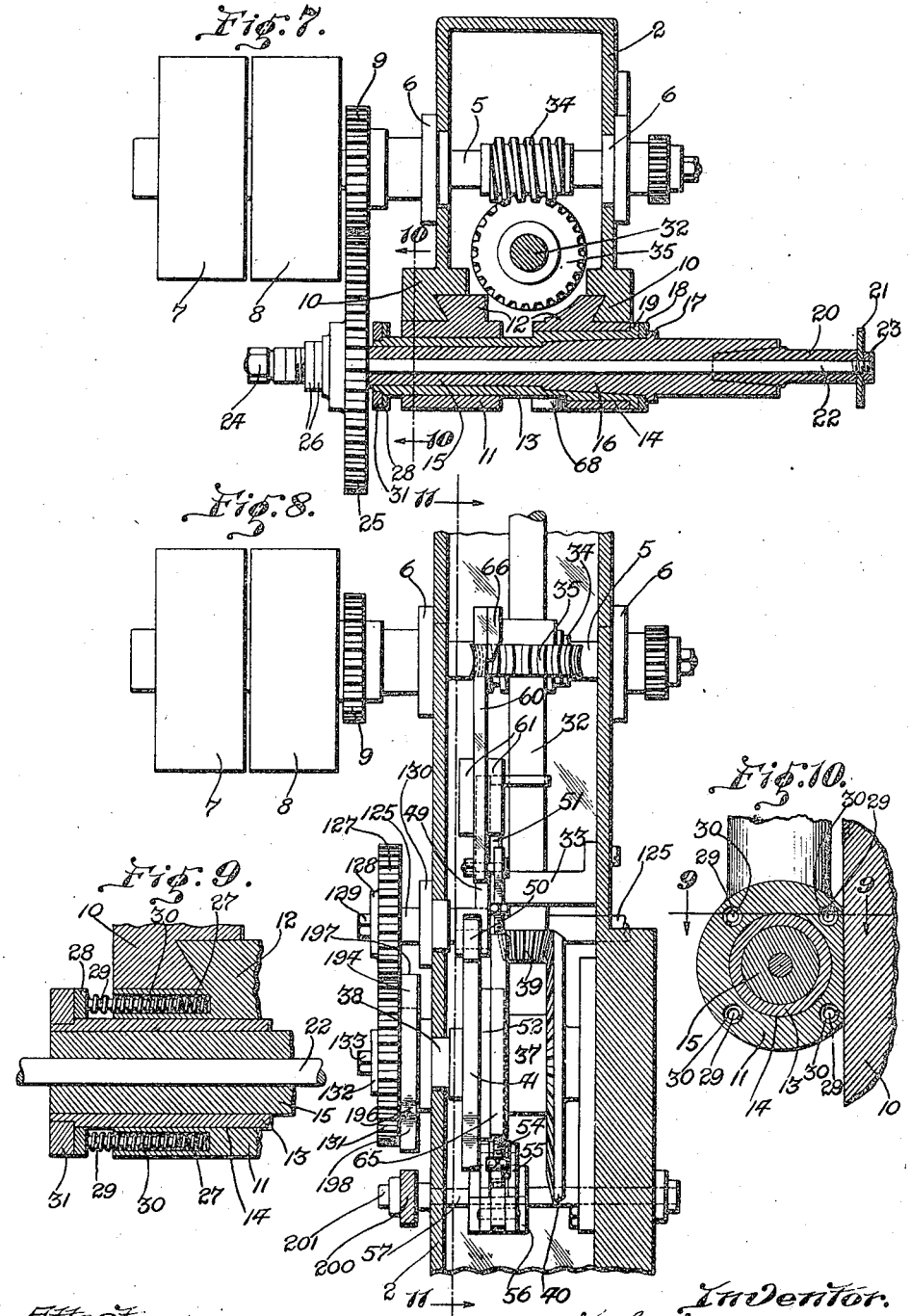

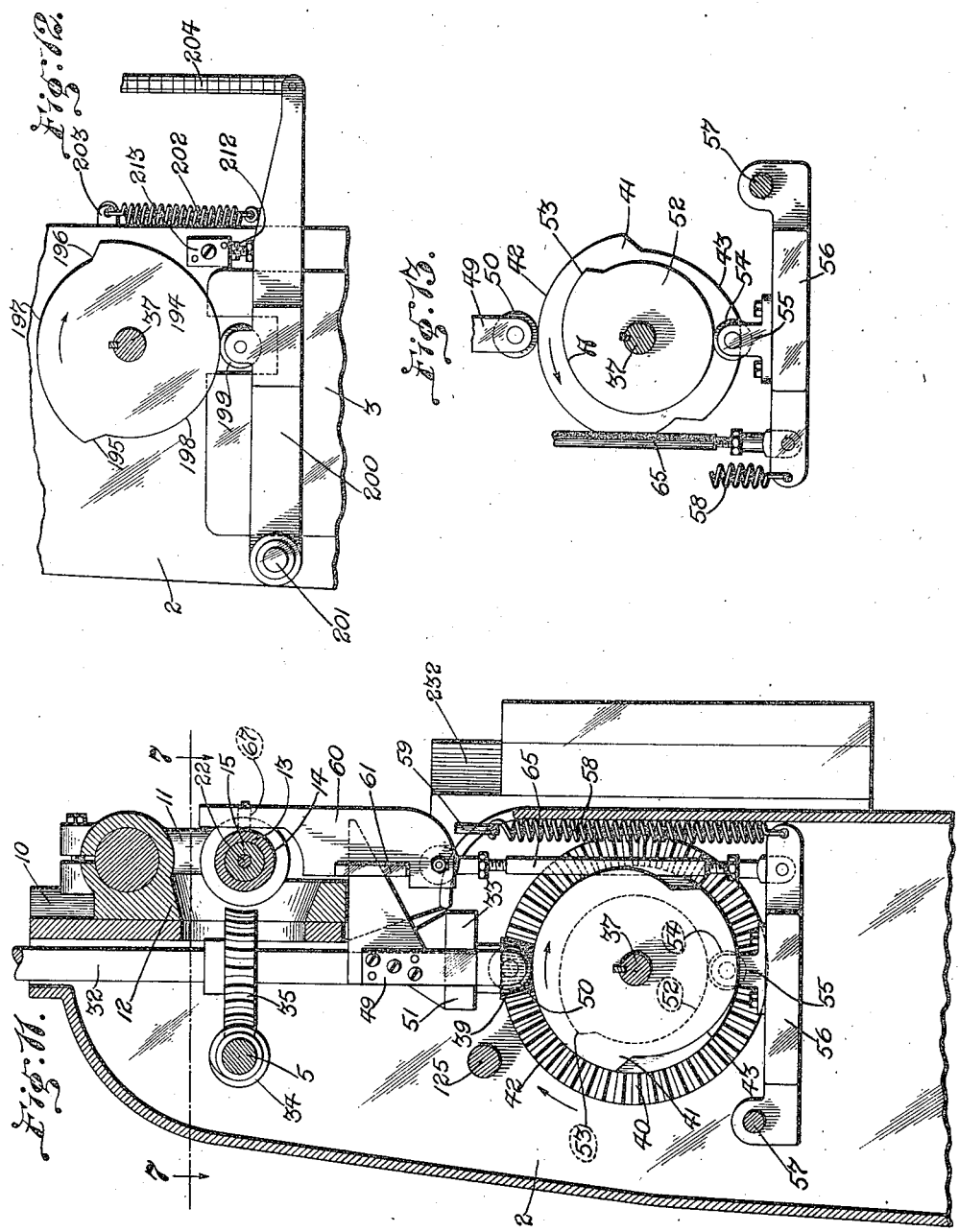

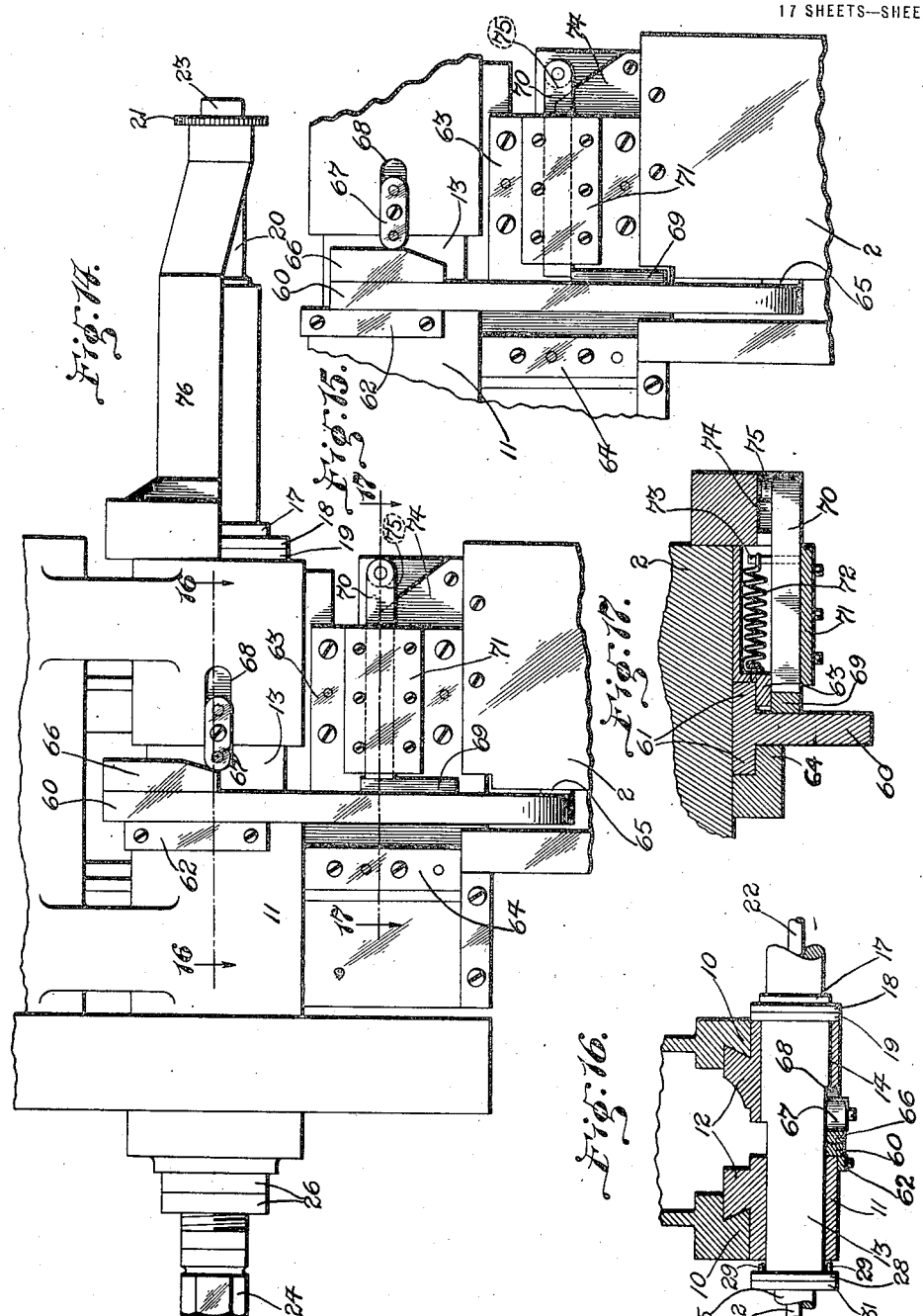

J. FLAMMANG.
MACHINE FOR MANUFACTURING PISTON RINGS.
APPLICATION FILED OCT. 7, 1919.
1,429,417.
Patented Sept. 19, 1922.
17 SHEETS—SHEET 10.
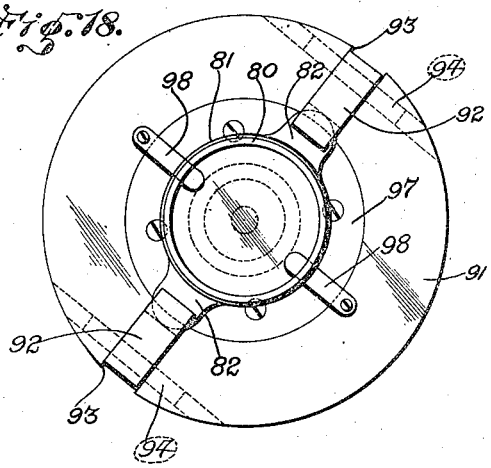
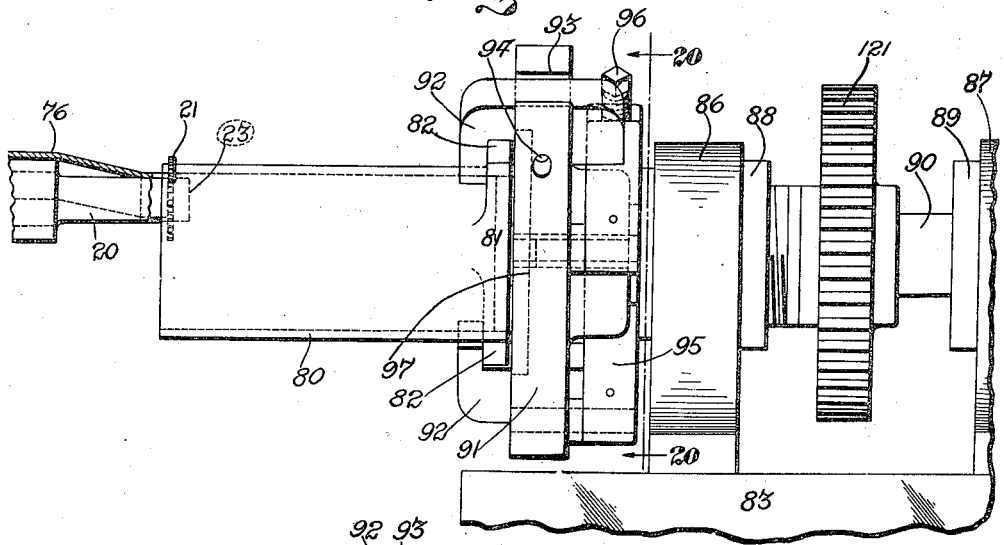
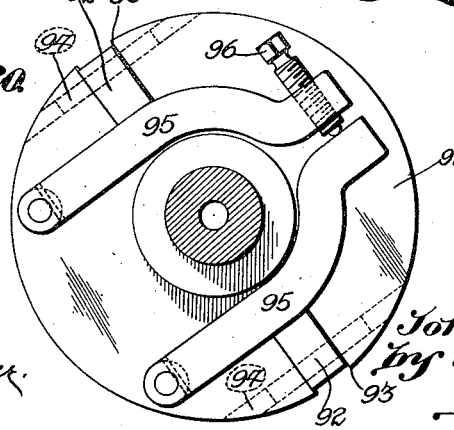
Attest.
Charles A. Becker.
Inventor.
John Flammang
by Rippey Kingsland
His Attorneys

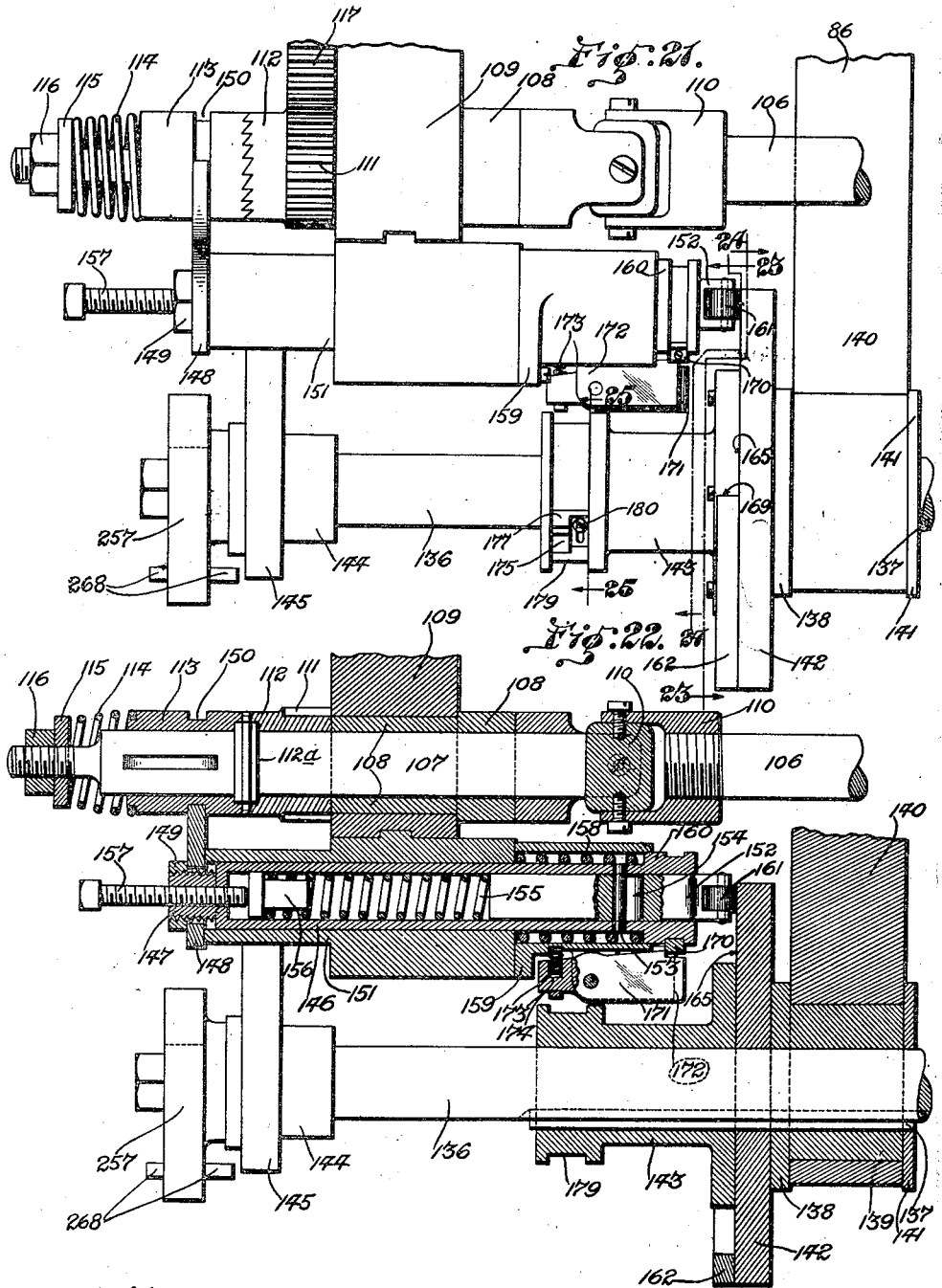

J. FLAMMANG.
MACHINE FOR MANUFACTURING PISTON RINGS.
APPLICATION FILED OCT. 7, 1919.
1,429,417.
Patented Sept. 19, 1922.
17 SHEETS—SHEET 12.
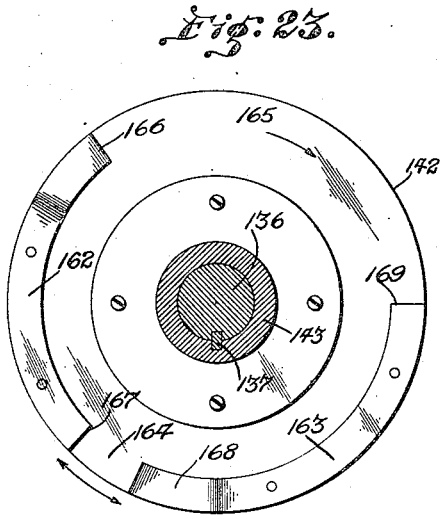
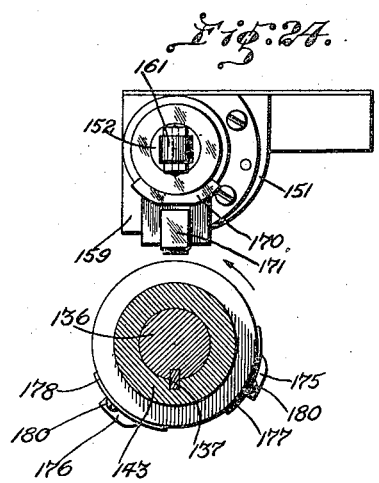
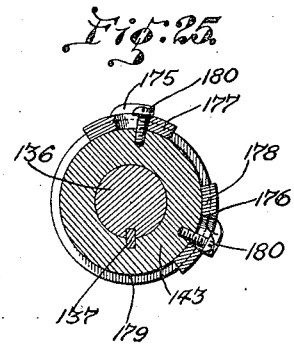
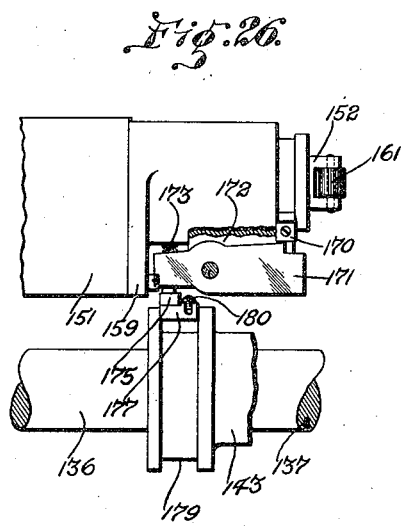
Attest.
Charles A. Becker.
Inventor:
John Flammang,
by Lippey & Kingsland
His Attorneys.

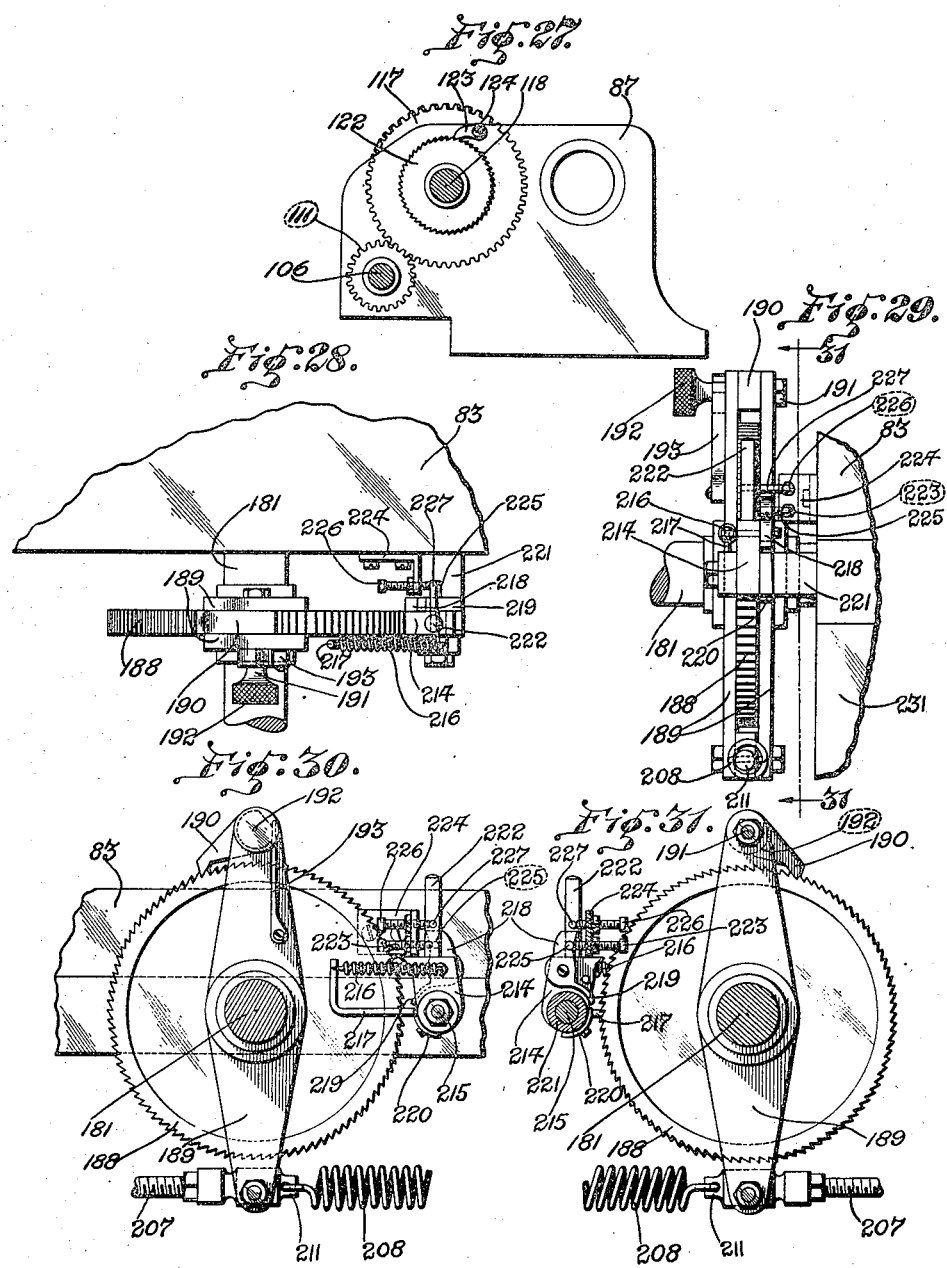

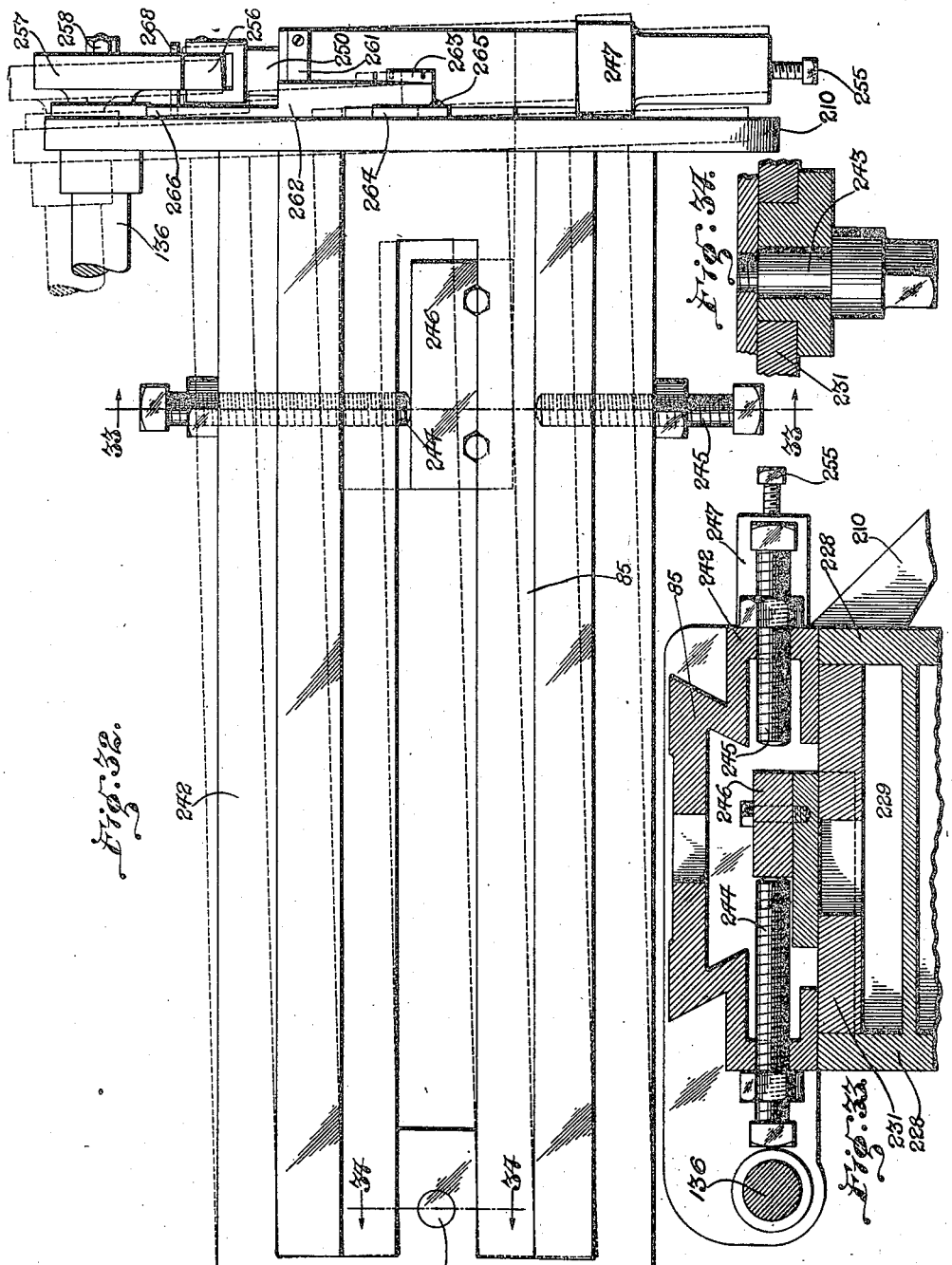

J. FLAMMANG.
MACHINE FOR MANUFACTURING PISTON RINGS.
APPLICATION FILED OCT. 7, 1919.
1,429,417. Patented Sept. 19, 1922.
17 SHEETS—SHEET 15.
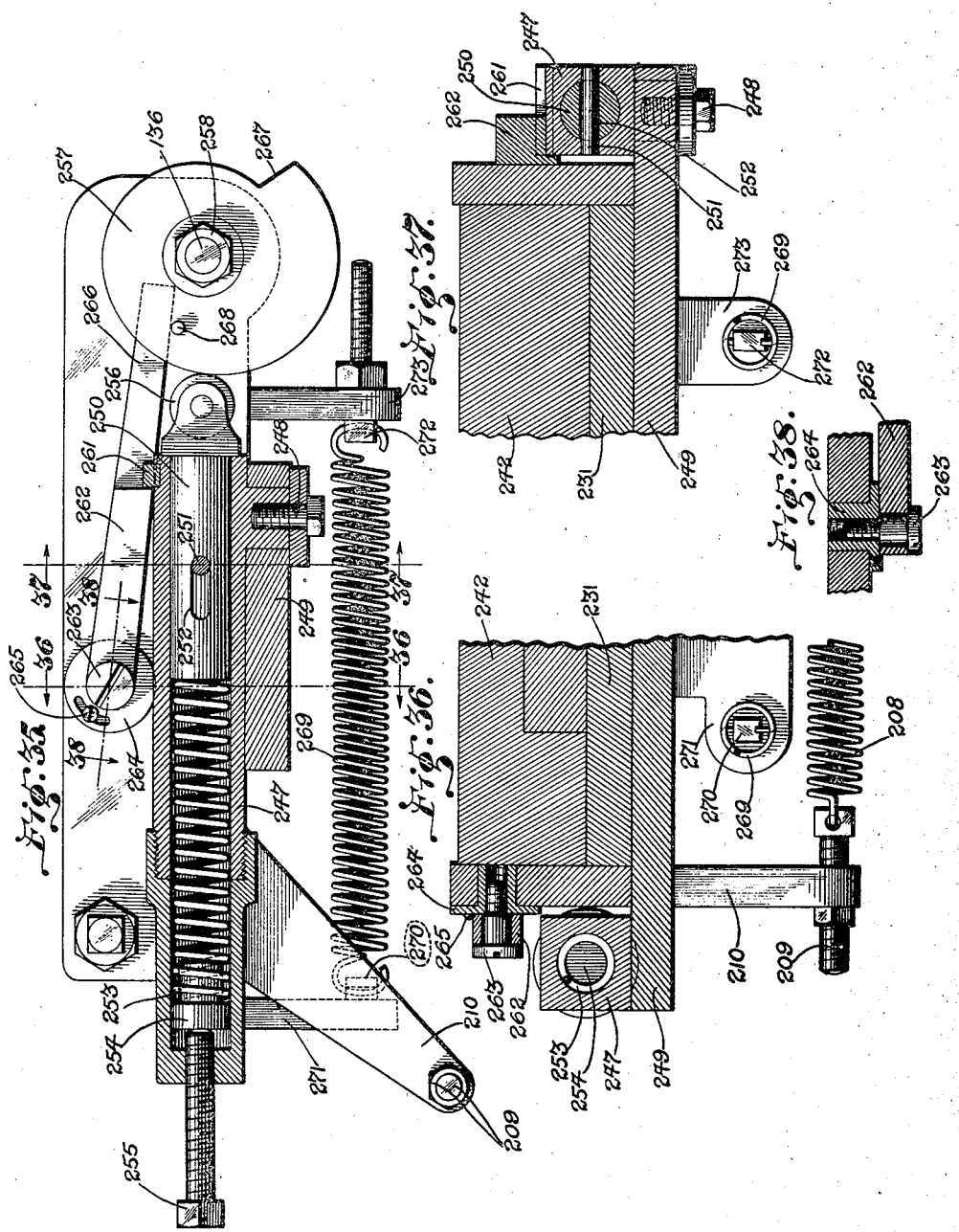

J. FLAMMANG.
MACHINE FOR MANUFACTURING PISTON RINGS.
APPLICATION FILED OCT. 7, 1919.

1,429,417.

Patented Sept. 19, 1922.
17 SHEETS—SHEET 16.

Attest.
Charles A. Becker.

Inventor:
John Flammang
by Rippey & Kingsland
His Attorneys

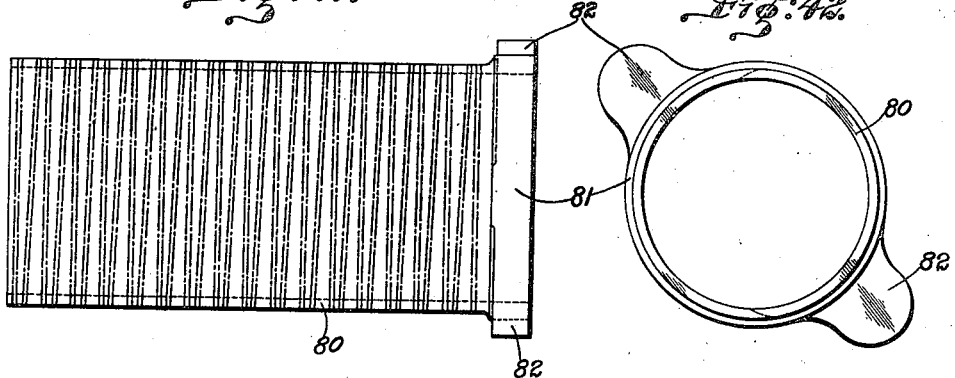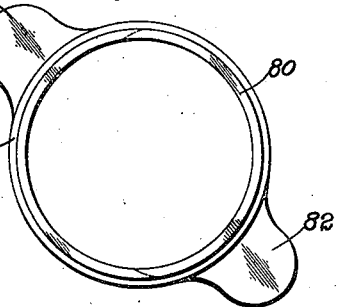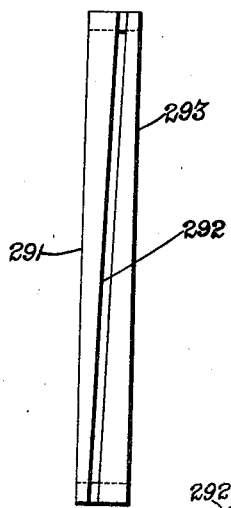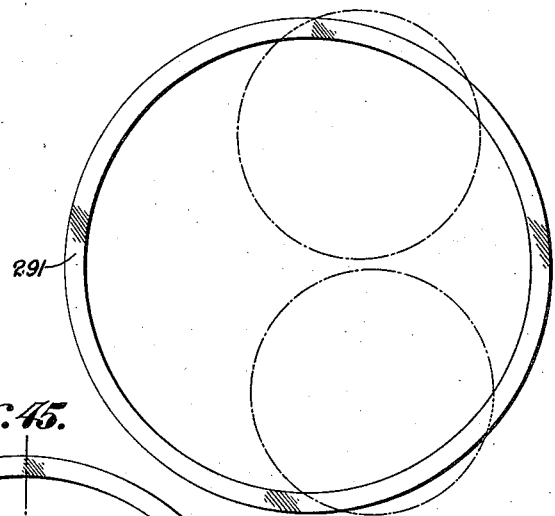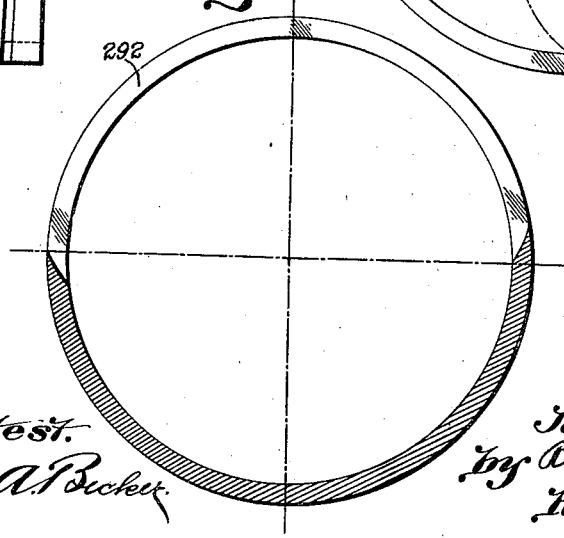

Patented Sept. 19, 1922.

1,429,417

UNITED STATES PATENT OFFICE.

JOHN FLAMMANG, OF UNIVERSITY CITY, MISSOURI, ASSIGNOR TO OTTMAR G. STARK, OF ST. LOUIS, MISSOURI.

MACHINE FOR MANUFACTURING PISTON RINGS.

Application filed October 7, 1919. Serial No. 328,972.

*To all whom it may concern:*

Be it known that I, JOHN FLAMMANG, a citizen of the United States, residing at University City, St. Louis County, and State of Missouri, have invented a new and useful Machine for Manufacturing Piston Rings, of which the following is a specification.

This invention relates to a machine for manufacture of piston rings and more particularly to a machine adapted to cut ring blanks having parallel edges from cylindrical ring pots and to cut a slot inclined with respect to the edges of the ring blank through a segment of the circumference of the ring.

The invention consists in the novel design and arrangement of the parts and in the association of the several mechanisms adapted for the production of the product.

An object of the invention is to provide a machine adapted to cut a plurality of rings from a cylindrical ring pot and to form a slot in the ring inclined with respect to the edges thereof for a segment of the circumference of the ring.

Another object of the invention is to provide a machine including a cutter and a chuck for supporting the work in operative relationship with the cutter, with means for controlling the operation of the cutter to automatically cut from a cylindrical ring pot a plurality of straight edged rings, and to cut an opening in the wall of the rings inclined at angle with respect to the edges thereof.

Another object of the invention is to provide in a machine of the character mentioned, an automatic controlling mechanism for the chuck whereby the rotation of the chuck is coordinately controlled with the operation of the cutter for the production of the product of the machine.

Another object of the invention is to provide in a machine of the character described, an automatic feeding mechanism whereby the work is advanced to the cutting mechanism.

Another object of the invention is to provide in a machine of the character described, an automatic mechanism for controlling in co-ordination with the feeding and cutting mechanism, the work supporting table whereby the work will be presented to the cutting mechanism in proper relationship to perform the duplex cutting operations of the machine.

Another object of the invention is to provide in a machine of the character described, an automatic stop mechanism for controlling the operation of the machine.

Additional advantages and features of the construction will be apparent from the following detailed description of an embodiment of the invention taken in connection with the accompanying drawings in which:

Fig. 1 is a plan view of the machine.
Fig. 2 is a front view thereof.
Fig. 3 is a rear end elevation.
Fig. 4 is a rear view.
Fig. 5 is a front end elevation.
Fig. 6 is a vertical section taken substantially on the line 6—6 of Fig. 1.
Fig. 7 is a horizontal cross section through the driving head of the machine, and is taken substantially on the line 7—7 of Fig. 11.
Fig. 8 is a vertical elevation of the driving head with the housing shown in section.
Fig. 9 is a fragmentary sectional view of the cutter spindle tensioning device taken substantially on the line 9—9 of Fig. 10.
Fig. 10 is a vertical section of the same device taken on the line 10—10 of Fig. 7.
Fig. 11 is a vertical section of the driving head taken substantially on the line 11—11 of Fig. 8.
Fig. 12 is a detailed view of the feed operating cam and the associated mechanism.
Fig. 13 is a detailed view of the cam construction and the associated parts controlling the cutter positioning mechanism.
Fig. 14 is an enlarged elevation of the machine head illustrating the mechanism for the longitudinal positioning of the cutter spindle.
Fig. 15 is an enlarged view of a portion of the cutter positioning mechanism showing particularly the mechanism for advancing the cutter longitudinally.
Fig. 16 is a cross section substantially on the line 16—16 of Fig. 14 illustrating further details of the cutter positioning mechanism.
Fig. 17 is a cross section taken substantially on the line 17—17 of Fig. 14 further illustrating details of the latch mechanism associated with the cutter mechanism.
Fig. 18 is a face view of the compensating chuck for supporting the work.

Fig. 19 is a view of the chuck in front elevation.

Fig. 20 is a rear face section of the chuck on the line 20—20 of Fig. 19.

Fig. 21 is an enlarged view illustrating the driving and controlling mechanism for the chuck.

Fig. 22 is a vertical section through the same elements illustrating further details of the construction.

Fig. 23 is a face view of the cam controlling the chuck operating mechanism, viewed on the line 23—23 of Fig. 21.

Fig. 24 is a section through a portion of the chuck controlling mechanism taken substantially on the line 24—24 of Fig. 21.

Fig. 25 is a cross section of a portion of the clutch controlling mechanism taken substantially on the line 25—25 of Fig. 21.

Fig. 26 is a fragmentary view of a latch construction constituting a part of the chuck controlling mechanism showing the latch in unlatched position.

Fig. 27 is a detailed view of a pawl and ratchet connection in the chuck driving mechanism.

Fig. 28 is a fragmentary plan view of a portion of the feeding mechanism for advancing the work to the cutter.

Fig. 29 is a front elevation of the same elements.

Fig. 30 is a side elevation of the same elements.

Fig. 31 is a view from the opposite side of the parts shown in Fig 30, and taken substantially on the line 31—31 of Fig. 29.

Fig. 32 is a plan view of the table of the machine showing in dotted lines the adjustment of the table in its position for supporting the work during the operation for cutting the inclined slot.

Fig. 33 is a cross vertical section taken on the line 33—33 of Fig. 32.

Fig. 34 is a detailed vertical cross section taken substantially on the line 34—34 of Fig 32 showing the pivot support for the swinging table.

Fig. 35 is a vertical cross section through a portion of the mechanism for oscillating the swinging table.

Fig. 36 is a vertical section taken substantially on the line 36—36 of Fig. 35.

Fig. 37 is a vertical section taken substantially on the line 37—37 of Fig. 35.

Fig. 38 is a section taken substantially on the line 38—38 of Fig. 35.

Fig. 41 is a side elevation of the ring pot from which the ring blanks are formed, with the cutting operations performed by the machine illustrated in construction lines.

Fig. 42 is a front end view of the ring pot.

Fig. 43 is an edge view of the ring blank cut by the machine.

Fig. 44 is a diagrammatic view illustrating the cutting operation of the machine, and Fig. 45 is a cross section of the ring blank illustrating the manner in which the inclined cut therein is formed by the machine.

Figure 1:
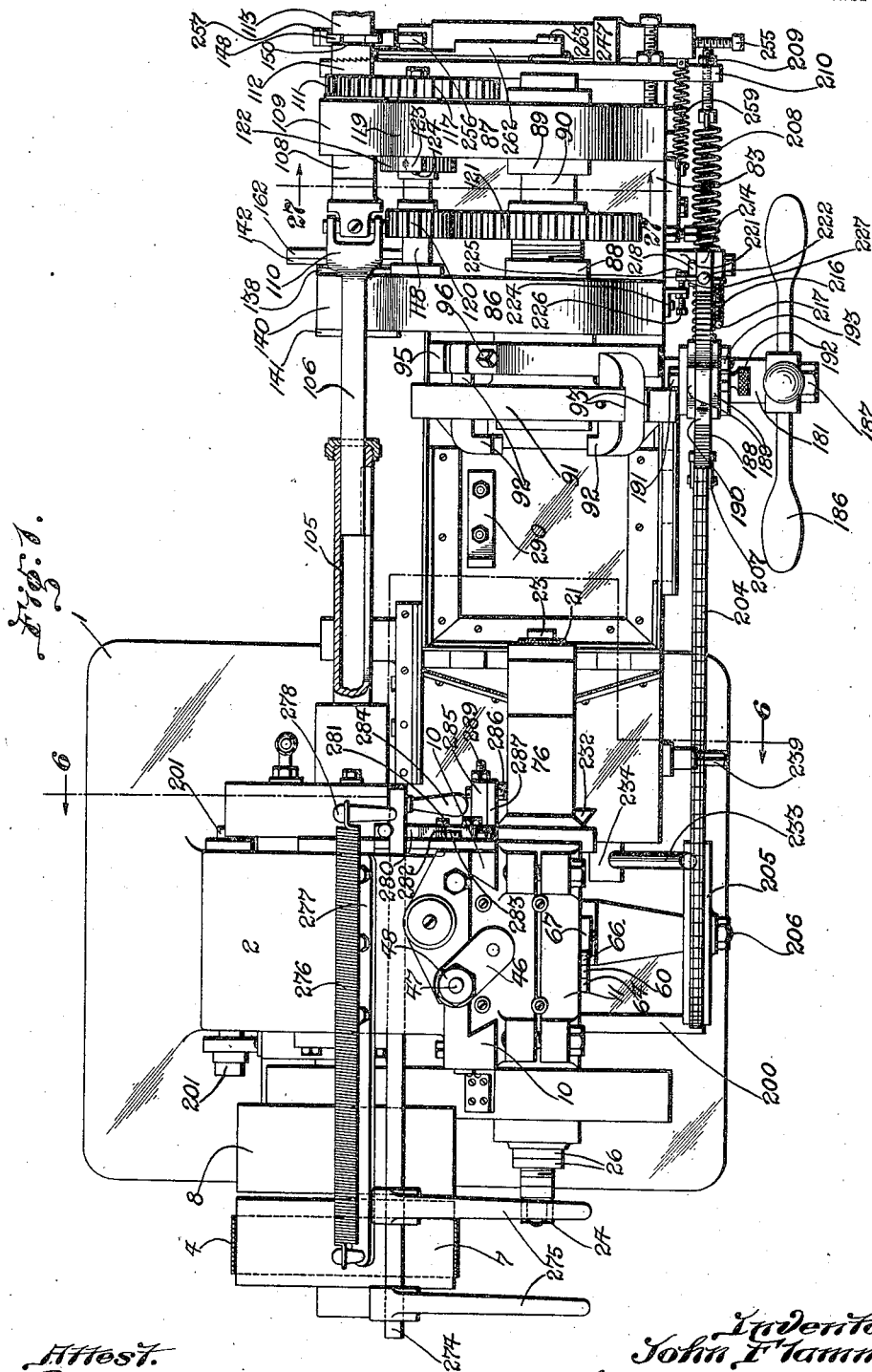

The machine includes several trains of mechanism associated to co-ordinately function in the production of the product of the machine. In order that the construction of each train of mechanism may be better understood, they will be described separately.

The mechanisms comprise, first, the cutter controlling mechanism which includes means for rotating the cutter, for raising and lowering it into contact with the work, and for moving it longitudinally of its axis in the operation for cutting the inclined slot; second, the mechanism for supporting the work, including the power connections for rotating the chuck by which the work is supported; third, the feeding mechanism for moving the chuck longitudinally of its axis to advance the work to the saw; fourth, the mechanism for shifting the table of the machine to present the work in its two positions, the one for the straight cut, and the other for the inclined cut; and finally the stop mechanism for automatically stopping the operation of the machine after the work has been completed.

*Cutter controlling mechanism.*—The machine has a base 1, constituting a support therefor. A housing 2 is integrally formed with the base 1. The housing contains a portion of the cutter controlling mechanism. The rear wall of the housing is preferably made with an opening closed by a removable cover plate 3 so that access may be attained to the mechanism within the housing.

The power for the operation of the machine is derived from any suitable source, the indicated means being from a belt 4 driven from an overhead countershaft. A power shaft 5 is journaled in bearings 6 supported in the upper part of the housing 2, the power shaft extending rearwardly from the housing a sufficient distance to provide space for a pair of pulleys 7 and 8, and for a driving pinion 9. The pulley 7 is loose on the power shaft, and constitutes an idler for the belt 4, while the pulley 8 is fast on the power shaft, constituting the drive pulley for the shaft.

The upper part of the housing 2 has guide ways 10, formed therein for supporting the vertically movable head 11 of the machine, which carries the cutter spindle.

The back face of the head is provided with rails 12 that fit within the guide ways 10 in the housing for holding the head in association with the housing, and providing a support and means whereby the head may be raised and lowered vertically. A bearing 13, constituting the cutter spindle support is mounted in a longitudinal bore 14 in the head 11.

The cutter spindle includes a sleeve 15 journaled within the bearing 13. The sleeve 15 is formed with a tapering portion 16 that matches with a taper in the front end of the bearing 13, so that when the spindle is assembled and mounted in the bearing, it may be held from longitudinal movement with respect to the bearing. The sleeve 15 has an annular flange 17 that bears against a collar 18 interposed between the flange 17 and a flange 19 on the front end of the spindle bearing. The collar 18 is provided so as to assure means of taking up wear between the spindle and the bearing.

The front end of the cutter spindle is made separate from the portion 16 of the spindle, so that in the case of breakage a new piece may be inserted without disassembling the cutter mounting. The separate piece comprises the sleeve 20 having a tapering end that fits in a tapering opening in the end of the portion 16 of the spindle.

The cutter 21 is attached to the spindle, and the two parts of the spindle are held in association by means of a draw rod 22, that extends longitudinally through an axial bore in the spindle members.

The rod 22 is threaded at the front end, and the cutter is removably clamped in place between the end of the spindle member 20 and a nut 23. The rod extends beyond the rear end of the sleeve 15 and receives, in threaded engagement, a centering nut 24 formed in the usual manner, with its inner body being tapered and received in a tapering end in the spindle member. The projecting end of the sleeve 15 is arranged to support in fixed engagement a gear 25, which is removably locked on the spindle by lock nuts 26. The spindle is in parallel alinement with the power shaft. The pinion 9 meshes with the gear 25, thereby constituting a speed reducing connection between the power shaft and the spindle. The gears 9 and 25 have teeth of sufficient length and sufficient play between the teeth to prevent disengagement of said gears by the vertical movement of the head 11.

The spindle bearing is arranged to be moved longitudinally in the machine head during the operation of cutting the inclined slot. In connection with the longitudinal movement of the spindle bearing, the full functioning of which will be more fully described hereinafter, a spring construction, illustrated particularly in Figs. 9 and 10, is provided. Surrounding the rear orifice of the bore in the machine head is a series of cylindrical pockets 27. A ring 28 supporting a series of pins 29 encompasses the spindle bearing near its rear end, and the pins 29 support and constitute guides for expansion springs 30, which are nested in and bear against the bottom of the cavities 27 at one end, and the ring 28 at the other end. The ring 28 is held in position by a collar 31 that is fitted over the end of the spindle bearing and rigidly connected therewith by any suitable means of attachment. The springs 30 are disposed at equi-distant points, so as to center the bearing for the cutter spindle in the bore in the head of the machine. The tendency of the springs 30 is to hold the bearing for the cutter spindle in its rearward longitudinal adjustment.

The shoulder 19 constitutes an abutment against the wall of the front orifice of the bore in the head of the machine, and limits the rearward movement of the spindle bearing in its support. The forward movement of the spindle bearing is controlled by mechanism overcoming the power of the springs 30 in the manner that will be hereinafter fully described.

The mechanism for effecting the adjustment of the cutter spindle comprises a vertical shaft 32 journaled in bearings 33 supported within the housing 2. The power shaft 5 has a worm drive connection with the shaft 32, comprising a worm 34 and a worm gear 35, the worm 34 being carried fast on the shaft 5, and the worm gear 35 being fast on the shaft 32.

A cam shaft 37 is journaled at right angles to the shaft 32 in bearings 38 supported by the housing 2 below the lower end of the shaft 32. The shaft 32 has speed reducing gear connections with the shaft 37 comprising a beveled pinion 39 supported at the lower end of the shaft 32, the pinion 39 meshing with a beveled gear 40 carried by the cam shaft 37.

A double faced cam 41 is keyed, or otherwise attached to the shaft 37, and constitutes the actuator for raising and lowering the machine head in order to present the cutter to the work for the duplex cutting operations.

The long face 42 of the cam is developed on gradually increasing radii, with a relatively sharp depression at the end of the cam curve. This face of the cam gradually raises the head, bringing the cutter into gradual contact with the work. During the raising of the head, the work is held stationary by mechanism hereafter described, and after the cutter has been raised to the hight point it is held in contact with the work during the complete circular cut, after which it is depressed by the downward movement of the head, as the cam roller reaches the shoulder at the end of the long face of the cam.

The short face 43 of the cam develops on gradually increasing radii from the shoulder at the end of the long face of the cam, and has a sharp depression at the end of the cam face. The action of the short face of the cam is to raise the head gradually into contact with the work, and hold it in raised position until the segmental inclined cut is developed in the ring blank, after which the head is depressed as the cam roller leaves the high part of the short face of the cam.

The head of the machine is normally held in depressed position by an expansion spring 44, which bears against the top of the head at one end and at the other end against a plate 46, which is supported by a rod 47 secured to and extending upwardly from the top of the housing 2. The tension of the spring 44 is controlled by adjusting nuts 48, which support the plate in contact with the threaded end of the rod 47.

Below the machine head and intermediate the head and the cam 41 is an angular arm 49 which extends under and in contact with the head at the upper edge of the arm. The arm 49 carries a cam roller 50 at its lower end. The arm 49 is mounted in a guide way 51 secured within the housing 2 of the machine. The cam roller 50 rides on the cam 41, effecting the raising and lowering of the head in opposition to the tendency of the spring 44, to position the cutter for the cutting operations as described.

During the complete circular straight edge cut, the cutter spindle is in a rearward position in the spindle support, and during the initial entering cut for the inclined cut the cutter is in the same position, but in order to develop the inclined cut, the saw spindle is gradually moved forward longitudinally of the axis of the work.

The mechanism for moving the cutter spindle longitudinally during the inclined cut includes a cam 52, which is keyed or otherwise affixed to the cam shaft 37 forward of the cam 41. The cam 52 is concentric throughout its face to a point approximately indicated by A, from which it develops on gradually increasing radii forming a cam shoulder 53.

The cam 52 co-operates with a cam roller 54, which is journaled in ears 55 supported on the upper face of the lever 56, the lever 56 is pivoted on a rod 57, supported by the housing 2 of the machine. The free end of the lever 56 is normally actuated to raised position by a retractile spring 58 attached to one end of the lever, and at the other end to an eye 59, supported by the wall of the housing 2.

A cam plate 60 provided with laterally projecting flanges 61 is slidably mounted in a guide way formed by angle plates 63 and 64. The angle plate 64 is attached to the front wall of the housing 2 of the machine by screws. A guide plate 62 is attached to the head of the machine and constitutes an abutment to preserve the cam plate in alinement.

The cam plate is actuated by the cam 52, being connected with the lever 56 by an adjustable draw rod 65. The cam plate supports on one face, near the top, a cam block 66, which co-operates with a block 67. The block 67 is attached to the side face of the cutter spindle support, and projects through an elongated slot 68 in the wall of the bore in the head of the machine, in which the cutter spindle is supported. The block 67 is preferably oblong in elevation, providing a rounded surface for contact with the inclined face of the cam block 66.

During the straight edge cutting operation of the machine, and the initial cutting operation for the inclined cut, the cam block is in raised position as shown in Fig. 14 of the drawing.

When the inclined cut is commenced, and during the continuation thereof, the saw spindle is gradually moved forward against the tendency of the springs 29. This operation is accomplished by the cam 52, through its connections with the cam block 66, the cam block being depressed when the cam roller rides over the cam shoulder 53, thereby depressing the link 56 that moves the draw rod 65 downwardly, carrying with it the cam plate 61 on which the cam block 66 is mounted.

When the cam plate has been depressed to its lowest position, which is at the end of the inclined cut in the work, it is locked in depressed position by a latch device, so that the saw may be removed from the slot in the work.

The latch device includes a lug 69 positioned on the side face of the cam plate, and a latch bar 70 supported in a housing 71 carried on the front face of the machine head. The latch bar is actuated by a retractile spring 72 in the housing 70 and attached at one end to the housing and at the other end to a pin 73 carried by the latch bar.

When the cam plate 60 is depressed to the position shown in Fig. 15, the latch bar is moved to engage over the top edge of the lug 69, holding the cam in depressed position.

In order that the cutter spindle support may be returned to normal position after the saw has been withdrawn from the inclined slot in the work, a means is provided for unlatching the cam plate so that it may be returned to normal position by the power of the spring 58. The unlatching means comprises a beveled faced block 74 attached to the housing 2 of the machine, and lying adjacent to the rear end of the latch bar 70. The latch bar 70 is provided with a roller 75 so that, when the head of the machine is depressed by the mechanism heretofore described, the roller 75 will contact with the inclined face of the block 74, thereby drawing the latch bar away from the cam plate 60, and disengaging the rear end thereof from the top edge of the block 69; whereupon the cam plate 60 returns to its normal position, and the cutter spindle support moves rearwardly through the medium of the springs 29.

A guard 76 is attached to the front face of the housing 2 of the machine and overhangs the cutter spindle. This guard forms a gatherer and support for the ring blanks after the cutting operations have been completed.

*Work supporting and rotating mechanism.*—The ring pots from which the ring blanks are cut are in the form of hollow open-ended cylinders 80, having a flange 81 at one end from which ears 82 extend. The work in this form is supported by a specially designed chuck in operative adjustment with the cutter, the chuck having power connections co-ordinated with the cutter positioning mechanism for rotating the work to perform the duplex cutting operations.

The work supporting and rotating mechanism includes a head stock 83, the head stock being provided with grooves 84 on its under face for a sliding fit with rails 85 on the upper face of the swinging table, so that the head stock may be moved longitudinally by the feeding mechanism, as will be here hereinafter described.

The head stock carries brackets 86 and 87, having axially alined bores therein for supporting the chuck spindle bearings 88 and 89. The chuck spindle 90 is journaled in the bearings 88 and 89 and carries at one end the face plate 91 of the chuck.

The chuck is specially designed for supporting the work in the form of the cast ring pot, and includes chuck jaws 92 which are in the form of U-shaped members pivotally mounted in channels 93 formed at opposite points in the edge of the face plate. The jaws are pivoted on pivot pins 94 mounted in openings formed in the edge of the face plate adjacent to the channels. The clamping means for the chuck jaws comprises levers 95 pivoted to the back face of the face plate; the levers being adjustable by a set screw 96, secured in the free end of one of the levers, and operating against the free end of the other lever for spreading the rear arms of the chuck jaws apart, and thereby causing the front arms of the chuck jaw to clamp the ears 82 formed on the ring pots.

The face plate is provided with a hardened disk 97 secured in the front face of the face plate in the central area thereof, so as to constitute a back abutment for the rear wall of the ring pot.

Compensating centering arms 98 are pivoted to the face plate in the space intermediate the forward end of the chuck jaws for holding the work in true alinement.

Figure 2:
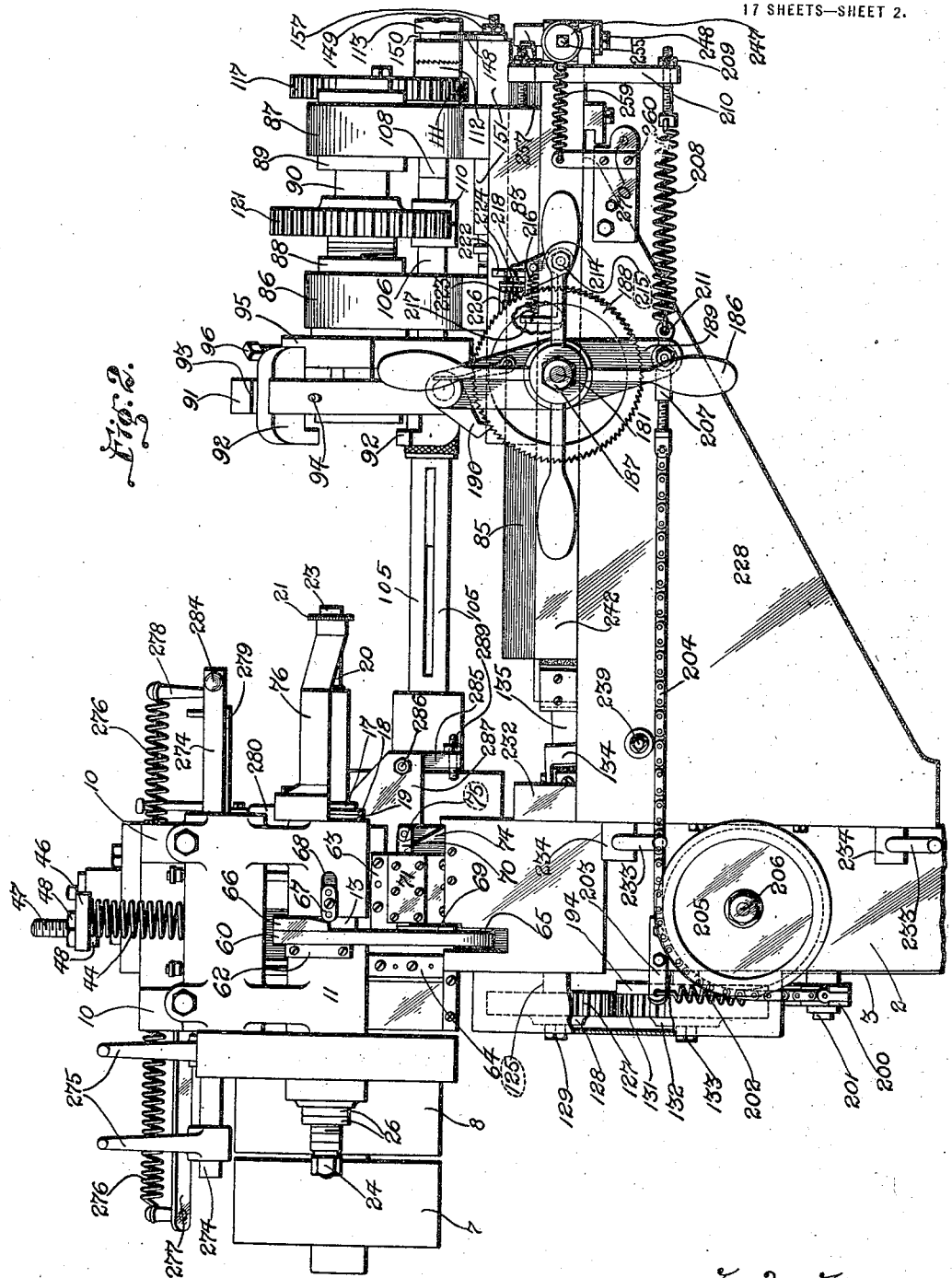
Figure 3:
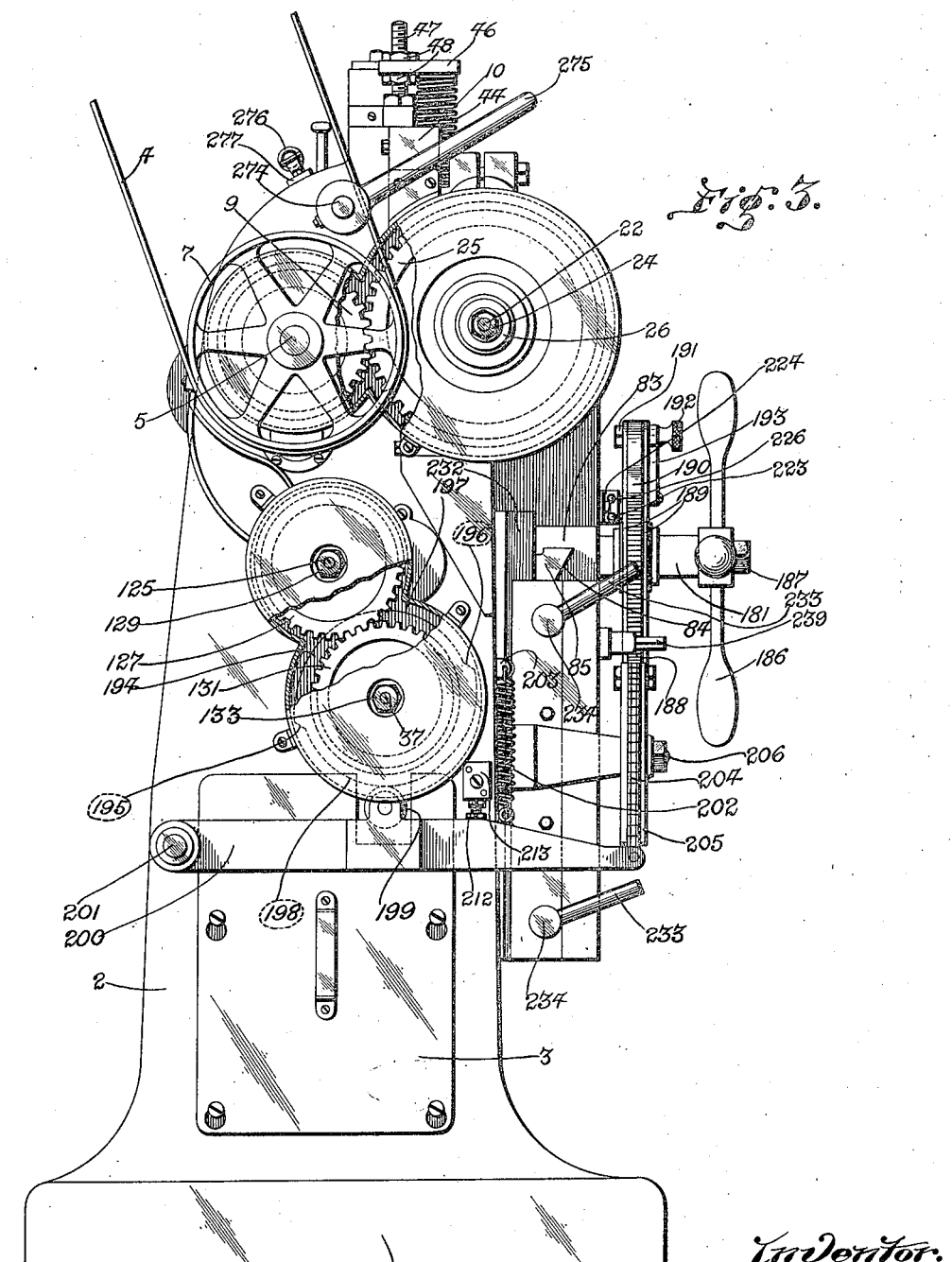
Figure 4:
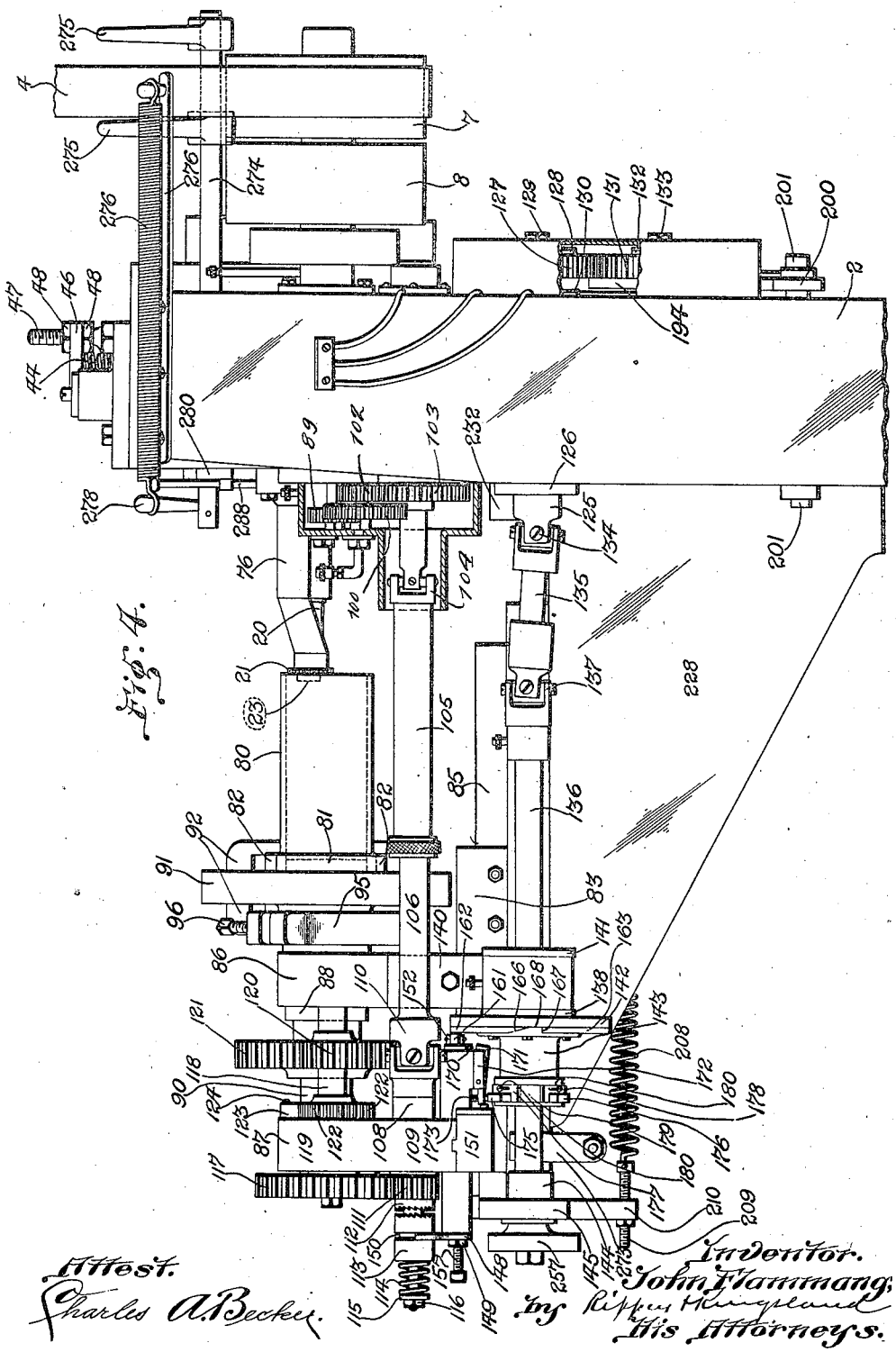
Figure 5:
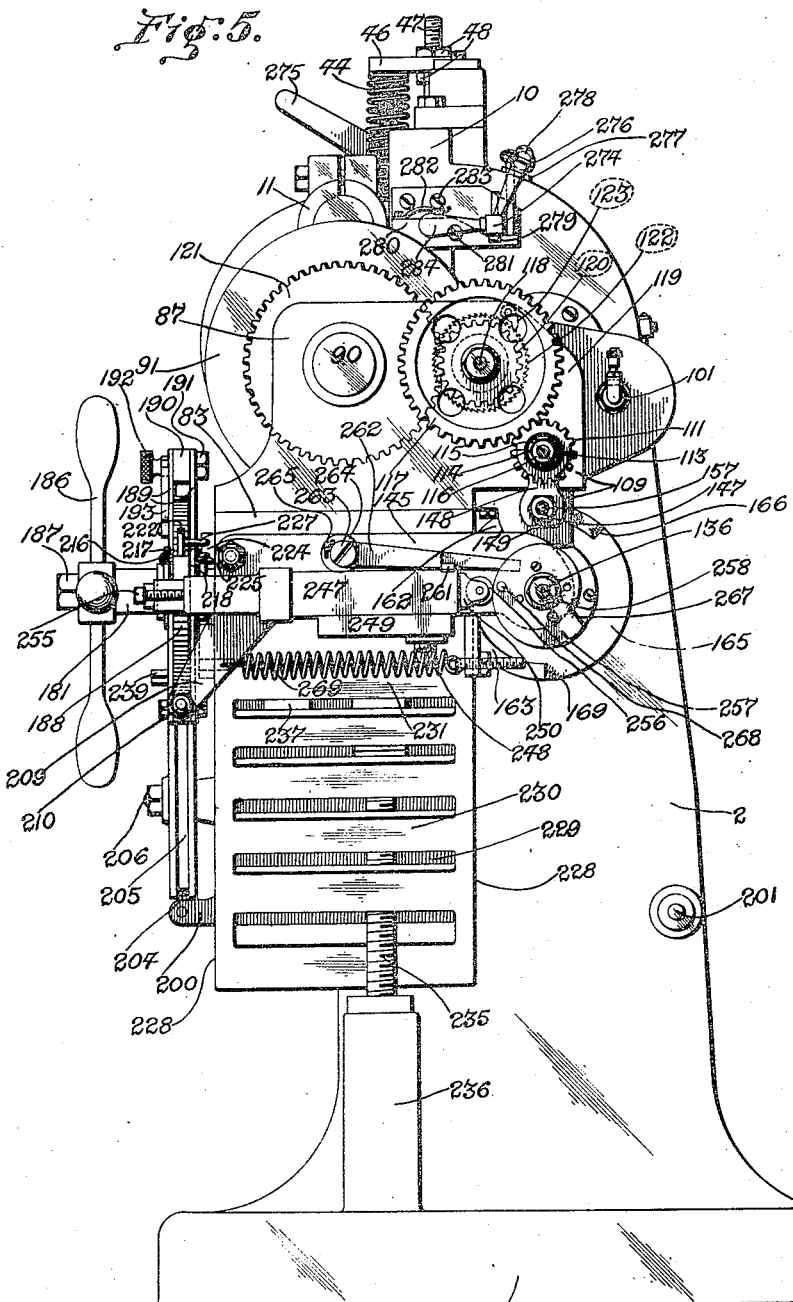
Figure 39:
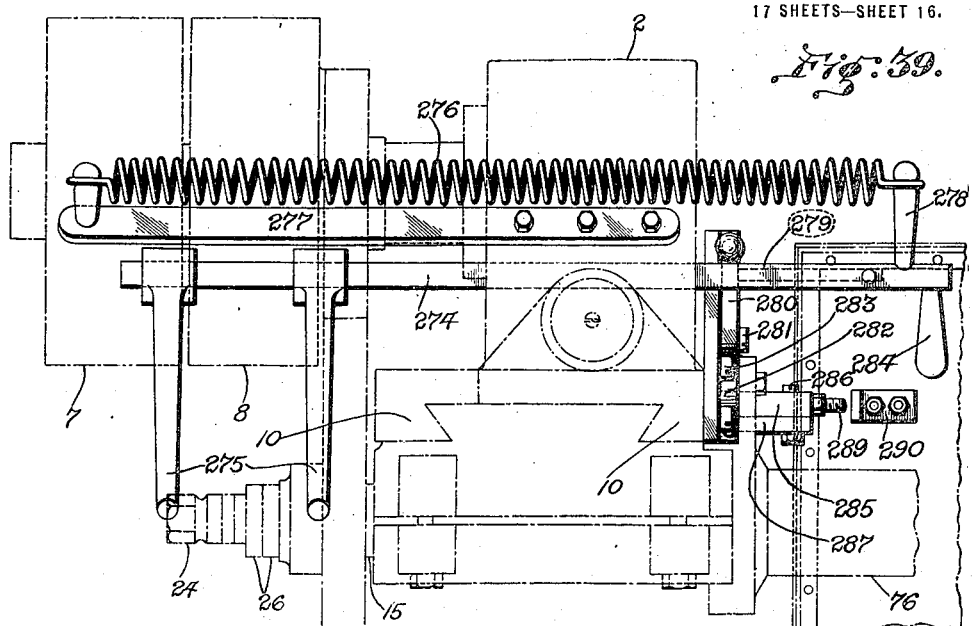
Fig. 39 is a plan view of the automatic stop mechanism.
Figure 40:
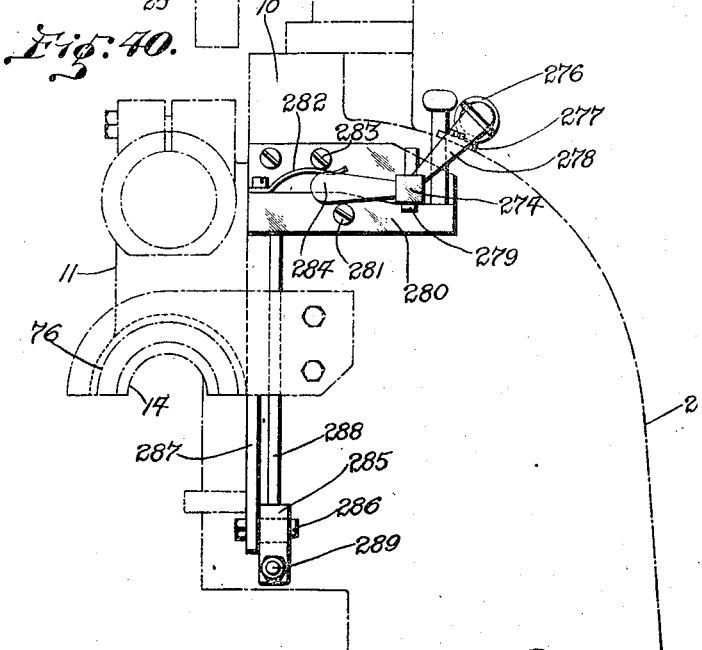
Fig. 40 is a front face view of a portion of the head of the machine illustrating a portion of the stop mechanism.

The chuck spindle is driven by power connections with the main shaft which include a pinion 99 mounted on the forward end of the power shaft that extends through the housing 2 of the machine. The pinion 99 drives a train of speed reducing gearing, including a gear 100 journaled on a stud shaft 101 supported by the housing 2. The gear is connected with a pinion 102 that meshes with a gear 103. The hub of the gear 103 is connected by a swivel joint connection 104 (Fig. 4) with a sleeve 105 constituting one section of a telescoping shaft; the other section 106 of the shaft being slidably mounted within the sleeve 105, and having a sliding keyed connection therewith (Figs. 1 and 2).

A short shaft 107 is journaled in a bearing 108 fitted in a bracket 109 formed in connection with the bracket 87. The shaft 107 is connected with the shaft 106 by a swivel joint connection 110. The shaft 107 loosely carries a pinion 111, the hub 112 of which is formed with teeth to constitute one member of a clutch device. In assembling the pinion 111 with the shaft 107, the shaft is slipped end-wise from the front end into the bearing 108, the pinion being retained in position by a collar 112$^a$ on the shaft. The other member of the clutch device is in the form of a clutch sleeve 113 splined on the end of the shaft 107. An expansion spring 114 encompasses the end of the shaft and bears against the clutch member 113 at one end and an adjustable collar 115 at the other end, the collar being adjustable by a nut 116, threaded on the end of the shaft 107. The adjustable nut 116 is provided as a tensioning device for the spring 114.

When the clutch device is engaged the pinion 111 is locked with the shaft 107, the shaft 107 being rotated by the connections described from the main power shaft of the machine. The pinion 111 meshes with a gear 117 that drives a short shaft 118 journaled in an extension bracket 119, the bracket 119 being formed in connection with and as an extension of the bracket 87. The opposite end of the shaft 118 carries a pinion 120, the pinion 120 meshing with a gear 121 fast on the chuck spindle.

When the clutch device is out of engagement, in order to prevent backward rotation of the chuck spindle, the shaft 118 is provided with a ratchet wheel 122, which co-operates with a pawl 123 mounted on a pivot pin 124 extending from the front face of the bracket 119. This pawl and ratchet device locks the chuck spindle against rotation during the initial cut through the wall of the ring pot, at which time the clutch device is out of engagement.

It will be observed that the trains of gearing in the power connections between the chuck spindle and the main power shaft results in a rotation of the work in opposite direction to the rotation of the cutter and that the work is rotated at a greatly reduced speed with respect to the rotation of the cutter.

During the entering cut, both for the straight edge and the inclined cut which occurs as the cutter is moved upwardly into contact with the inner wall of the ring pot, the chuck spindle is idle, holding the work stationary. As soon as the cutter has cut through the ring pot wall the chuck spindle is rotated, revolving the ring pot while in contact with the cutter to complete the operation.

In the case of the straight edge cut, the ring pot revolves slightly in excess of a complete circle, and in the case of the inclined cut, the rotation is for a segment of a circle, equal to the length of the cut.

The starting and stopping mechanism for controlling the rotation of the chuck spindle and for timing the rotation of the chuck spindle in co-ordination with the cutter positioning means, includes a shaft 125 journaled in bearings 126 supported in the housing 2 of the machine. The shaft 125 carries a gear 127 on the end thereof that extends beyond the rear wall of the housing 2. The gear 127 is removably locked on the shaft 125 by a collar 128 and a nut 129 threaded over the end of the shaft. The shaft 125 is held from longitudinal displacement by a collar 130. The gear 127 is driven from the shaft 37 by a gear 131, locked on the end of the shaft 37 by a collar 132, and a nut 133. The gears 127 and 131 are of equal diameter, so that the shaft 125 is driven in equal ratio to the shaft 37, but in opposite direction. The shaft 125 has a universal joint connection 134 with a short shaft 135, the short shaft 135 in turn being connected with a horizontal shaft 136 by a universal joint connection 137. The shaft 137 has a key and slot connection with a bushing 138, the bushing 138 being journaled for rotation in a bearing 139 formed in a bracket 140, which bracket is supported by the head stock of the machine. A lock collar 141 is provided in connection with the bushing 138 to hold the parts in adjustment. A cam disk 142, also having the key and slot connection with the shaft 136, is connected with the front face of the bushing 138, and revolves with the shaft. A sleeve 143 is supported in connection with the shaft 136, and likewise has key and slot connection with the shaft. The sleeve 143 carries the tappets that operate the latching device of the clutch controlling mechanism, the details of which will be hereinafter described. The forward end of the shaft 136 is journaled in a bearing 144 supported by a bracket 145 that is carried by the table of the machine.

It will be observed that the bushing 139, the collar 141, the cam plate 142, and the sleeve 143 are all slidable longitudinally of the shaft in co-ordination with the movement of the head stock of the machine, but that the shaft 136 has no longitudinal movement as it has bearing in the bracket supported by the table of the machine.

The mechanism for shifting the clutch includes an actuator 146 in the form of a hollow cylindrical case having a threaded extension 147 that supports the bifurcated clutch finger 148, the clutch finger 148 being removably locked on the extension 147 by a lock nut 149 and having engagement in a groove 150 in the slidable clutch member 113. The actuator is slidably mounted in a housing 151 that is rigidly supported by the bracket 109 forming a part of the head stock assembly.

A plunger 152 is slidably mounted in the open end of the actuator, and is connected therewith by a pin 153 supported by the walls of the actuator and extending through a slot 154 in the plunger. The relative sliding movement between the plunger and the actuator is limited by the pin and slot connection, the sliding movement being provided in order that energy may be stored in an expansion spring 155 mounted in the actuator between the inner end of the plunger and a slidable member 156 mounted within the actuator. The member 156 co-operates with a set screw 157 threaded through an opening in the end of the actuator and bearing against the member 156. For adjusting the tension of the spring 155 an expansion spring 158 is fitted over the end of the actuator, and is held in position in an extension 159 of the housing 151. The spring 158 abuts at its inner end against the wall of the housing 151, and at the other end against a shoulder formed by a flange 160 on the actuator. The tendency of the spring 158 is to move the actuator longitudinally in the housing 151 in a direction to engage the clutch and to carry the end of the plunger 152 into contact with the cam 142.

The plunger 152 is provided with a roller 161 that operates on the cam face of the cam 142. The cam plate 142 carries cam shoulders 162 and 163 with intermediate low segments 164 and 165. The cam shoulder 162 has a gradually inclined face 166 that inclines upwardly from the low segment 165 in the direction of the rotation of the cam as indicated by the arrow, the cam face developing into a high face that extends to an abrupt shoulder 167. The cam shoulder 163 has an inclined face 168 that develops upwardly from the section 164, forming a high segment which depresses at its end abruptly forming a shoulder 169.

The cam, in co-operation with a latching device, controls the operation of the clutch, and thereby the rotation of the chuck.

The latch device includes a detent 170 attached to the end of the actuator 146, and a locking lever 171 pivoted in a bracket 172 carried by the extension 159 of the housing 151. One end of the locking lever is provided with a notch that engages the detent 170, the notched end of the locking lever being raised by the action of an expansion spring 173 nested in a cavity 174 in the opposite end of the lever; the spring 173 bearing against the wall of the extension 159. When the free end of the locking lever 173 engages behind the detent 170 the actuator is held in extended position.

The latching lever is controlled by tappets 175 and 176. The tappets 175 and 176 are carried by plates 177 and 178 that are mounted in a channel 179, formed in the end of the sleeve 143. The plates 177 and 178 have an adjustable connection in the channel, being provided with slots that receive cap screws 180. This construction permits a relative circumferential adjustment of the tappets within the limits of the length of the slots 180. When the tappets contact with the end of the locking lever 170 the actuator is unlatched, and is free to move longitudinally in the housing 151.

In order that the operation of the clutch device may be better understood, the cycle of operation will be given with particular reference to Figs. 21-26, inclusive. When the parts are in the position shown in Figs. 21 and 22, the clutch is in engagement for rotating the chuck spindle. It may be assumed that the travel of the roller 161 has commenced just after leaving the abrupt shoulder 169 of the cam face. This point is the beginning of the rotation of the chuck for the straight edge cut in the work. Up to this point, the chuck is held stationary during the entering cut of the cutter. After the entering cut, the clutch remains in engagement during the travel of the roller in the low segment 165 of the cam. When the roller rides on the inclined face 166 of the cam shoulder 162, the plunger 152 is moved inwardly in the actuator case, thereby contracting the spring 155. When the roller has reached the crest of the inclined face 166, the tappet 175 releases the actuator lock and the actuator is forced longitudinally in the housing 151 by the excess power of the spring 155, and against the tendency of the springs 114 and 158. This movement of the actuator stores sufficient power in the spring 114 to return the clutch to engagement when the spring 155 is released, and also sufficient power in the spring 158 for the return longitudinal movement of the actuator.

The clutch is held disengaged during the travel of the roller on the high face of the shoulder 162, so that the operation of the chuck spindle is stopped during this interval of travel. In this interval, the cutter spindle is depressed by the mechanism heretofore described, and is returned into contact with the work for the initial cut through the wall of the ring pot for the inclined cut, the work advancing to the cutter by the feeding mechanism that will be described hereinafter.

When the roller 161 reaches the end of the cam shoulder 162 it enters the low segment 164, which movement relieves the tension on the spring 155, whereupon the spring 114 moves the clutch into engagement. As soon as the tension is relieved on the spring 155, the actuator is moved outwardly by the spring 158, being latched in outward adjustment by the locking device.

During the travel of the roller in the low segment 164, and over the inclined face 168, the chuck is rotated for performing the inclined cut. When the roller has reached the crest of the inclined face 168, the tappet 176 releases the latch device and the clutch is disengaged in the manner above described, and remains disengaged until the roller reaches the depression at the shoulder 169. During this stopped interval of the rotation of the chuck spindle, the work is held stationary for the removal of the cutter from the inclined slot for the advancement of the work, and for the raising of the cutter for the initial entering cut for the straight cutting operation of the machine.

*Feeding mechanism.*—The mechanism for moving the head stock towards the cutter and thereby advancing the work after each cutting operation is co-ordinated with the cutter positioning mechanism and chuck rotating mechanism. The feeding mechanism is designed to advance the ring pot after the straight edge cutting operation a sufficient distance for the entering cut of the inclined cut, and to advance the work after the inclined slot has been formed for the straight edge cutting operation.

It will be remembered that the cutter is moved forward across the work in the performance of the inclined cut, so that the feeding mechanism, after this operation has been completed, must feed a distance in excess of the distance fed after the straight edge cutting operation, to compensate for the movement of the cutter in order to present the work in proper adjustment for a second straight edge cut.

The feeding mechanism includes a transverse shaft 181 journaled in bearings 182 in the table of the machine (see Fig. 6). The base plate of the head stock, it will be remembered, is slidably mounted on the table of the machine. A rack 183 is secured to the under face of the base plate of the head stock and extends through a longitudinal slot 184 in the web between the rails 85. The rack 183 meshes with a pinion 185 fast on the shaft 181. The shaft 181 extends forward from the front edge of the table of the machine, and is provided with a hand wheel 186 for the manual rotation of the shaft and thereby the adjustment of the head stock, the hand wheel 186 being removably locked on the shaft by nut 187.

A ratchet wheel 188 is fixed to the shaft 181 intermediate the hand wheel and the front edge of the table of the machine. A pair of rocking arms 189 are loosely fitted on the shaft 181 on each side of the ratchet wheel 188. A pawl 190 is rigidly connected with a pivot pin 191 supported between the upper ends of the arms 189. The pivot pin 191 is extended forward and is provided with a finger piece 192 for adjusting the pawl 190. The pivot pin 191 is formed with a flat face that co-operates with a leaf spring 193 to hold the pawl 191 in raised or unlocked position out of engagement of the teeth of the ratchet wheel 188. This adjustment of the pawl is provided so that the feeding mechanism may be disengaged, permitting the head stock of the machine to be moved in both directions by the hand wheel 186, for the initial adjustment of the work in relation to the cutter.

The head stock is stepped forward in the operation of the machine by the oscillation of the arms 189. The mechanism for oscillating the arms 189 includes a cam 194 mounted on the shaft 37 between the back face of the housing 2 and the gear 131. The cam 194 is provided with two cam shoulders 195 and 196, so formed on the cam as to provide a short segment 197 and a long segment 198. The cam co-operates in connection with a cam roller 199 to oscillate the lever 200 pivoted at one end on the rod 201 supported by the housing of the machine. The lever 200 is normally held in raised position to maintain the cam roller in contact with the cam by a retractile spring 202, secured at one end to the lever and at the other end to an eye 203, supported by the housing of the machine. During the interval of travel of the cam roller from the shoulder 195 to the shoulder 196, through the segment 198, the head stock is stationary, providing an interval for the straight edge cutting operation. As the cam roller 199 rides over the surface of the shoulder 196, the lever 200 is gradually depressed the length of the radii of the cam shoulder 196, in excess of the radii of the segment 198. When the cam roller rides from the shoulder 196 the lever 200 is released, accomplishing the forward feed of the head stock at the end of the straight edge cutting operation, and positioning the work for the inclined cut. During the interval that the cam roller travels over the segment 197 the head stock is stationary for the inclined cut. As the operation for performing the inclined cut requires a less interval of time than the straight cut, the length of travel over the segments 197 and 198 are proportioned in proper ratio to compensate for the difference in the intervals between the straight edge cutting operation and the operation for the inclined cut. As the cam roller rides over the surface of the shoulder 195 the lever 200 is again depressed, being released when the roller leaves the shoulder 195, causing the forward feed of the work after the performance of the inclined cut.

The extreme radius of the cam shoulder 195 is slightly in excess of the extreme radius of the shoulder 196, to provide for the additional forward travel of the head stock to compensate for the movement of the cutter in the inclined cutting operation.

The free end of the lever 200 has a flexible connection 204 with the lower ends of the arms 189, the connection 204 operating over a sheave 205 mounted on a rod 206, extending from the front face of the housing 2 of the machine. The connection between the end of the chain 204 and the arms 189 includes a swivel bolt 207, so that the length of the connection may be varied to control the extent of oscillation of the arms 189, and thereby the length of the travel of the head stock during each feeding operation. The lower ends of the swinging arms 189 are held in opposition to the movement imparted thereto, through the chain 204 and its operating connections, by a retractile spring 208 supported at one end by an adjustable bolt 209 mounted in a bracket 210 secured to the table of the machine. The bolt 209 provides a means for tensioning the spring 208. The spring at its opposite end is secured in an eye 211 connected with the lower ends of the arms 189.

Obviously, as the lever 200 is depressed by the cam shoulders 195 and 196, there is a pull exerted on the lower ends of the arms 189 counter to the tension of the spring 208. This movement of the arms carries the pawl 190 over the face of the ratchet teeth on the ratchet wheel 188 the distance of the movement of the arms. When the power is released on the chain 204 the arms are returned by the spring 208, moving the ratchet wheel the distance of the oscillation of the arms, and thereby, through the rotation of the shaft 181 and its connections with the head stock, the head stock is advanced toward the saw.

The extent of movement of the lever 200 may be adjusted by a set screw 212 mounted in a bracket 213 secured to the rear wall of the housing 2 of the machine above the upper edge of the lever. This adjustment limits the extent of movement of the lever 200 and thereby, through its connections, the length of the segment of oscillation of the arms 189.

As the cutter moves longitudinally of the work in the inclined cutting operation, there would be a tendency to push the head stock away from the cutter unless the shaft 181 were locked against return rotation. In order to prevent this receding movement of the head stock, a back lock device is provided for the ratchet wheel 188. The lock mechanism includes a pawl 214 pivoted on a rod 215 extending from the front edge of the table of the machine. The pawl 214 is normally moved to lock in engagement with the ratchet wheel 188 by a retractile spring 216 attached at one end to the side face of the pawl, and at the other end to an arm 217 supported by the rod 215. The pawl 214 carries on one face thereof a latch 218, having a tail piece 219 adapted to engage against an abutment 220 on a sleeve 221 supported on and secured to the shaft 215, to hold the pawl 214 out of locking engagement with the ratchet wheel. A rod 222 extends upwardly from the top edge of the pawl 214, providing means for manually raising the pawl 214 out of engagement with the ratchet teeth. When the pawl 214 is raised, the latch 218 operates by gravity to engage the tail thereof with the abutment 220. After being raised the pawl 214 remains in locked engagement so that the head stock may be operated in both directions manually by the hand wheel 186. A release device for unlocking the pawl 214 when the head stock is moved to its forward limit of travel is provided, and comprises a set screw 223 mounted in an angular bracket 224 carried by the base plate of the head stock. The end of the set screw 223 is in alinement with a pin 225 carried on the face of the latch 218. When the head stock is moved to its forward position, the end of the set screw 223 engages the pin 225, raising the tail of the latch 218 out of contact with the abutment 220, permitting the pawl 214 to be drawn into engagement with the ratchet wheel 188. In order to regulate the pawl 214 so that it will properly engage the teeth of the ratchet wheel, and to co-ordinate the back lock with the feeding pawl 190, a second adjusting screw 226 is mounted in the bracket 224, and is adapted to contact at its end with a pin 227 holding the pawl 214 after the lock has been released from engagement with the ratchet wheel until the head stock has been moved forward a sufficient distance to clear the end of the set screw 226 from the pin 227.

*Table shifting mechanism.*—The machine is constructed so that the table that supports the head stock may be shifted, presenting the work in two angular positions, the one in direct alinement with the cutter spindle for the straight edge cutting operation, and the other at an angle to the axis of the cutter spindle for the inclined cut.

The table support comprises a knee formed from angular side plates 228, a back wall 229, and connection webs 230 at the front of the knee, the upper face of the knee forming a horizontal bed plate 231. The back wall of the knee has sliding engagement with the front wall of the housing 2, being connected therewith by rails 232 operating in grooves formed in the knee. Screws 233 operating in brackets 234 carried by the knee, provide means for locking the knee in its different vertical adjustments.

A raising and lowering device for the knee includes a jack screw 235 threaded at its lower end into a standard 236 supported by the base 1 of the machine, and at its upper end in the bracket 237. The jack screw is operated by a shaft 238 journaled in the bracket 237 and in one of the side plates of the knee. The shaft 238 extends outwardly beyond the front of the machine, and is provided with a polygonal end 239 for the reception of a crank arm, whereby the shaft is rotated. The inner end of the shaft 238 carries a beveled pinion 240 that meshes with a beveled gear 241 on the end of the jack screw 235. This adjustment for raising and lowering of the knee is provided so that the machine may operate on ring pots of varying diameters. The swinging table 242 is mounted to slide on the bed plate of the machine, to which it is pivoted by a pivot pin 243, extending through the top wall of the bed plate, and into the bottom wall of the swinging table. The pivot is alined with the center of the cutter spindle when the spindle is in its normal adjustment and so that the center swings on an axis perpendicular to the axis of the cutter spindle. The lateral movement of the table is adjusted by means of set screws 244 and 245 that extend through the side walls of the table, and abut at their inner end against a block 246 secured to the top face of the bed plate. In adjusting the swinging table on the bed plate, the alinement of the table with the cutter spindle is effected by the adjustment of the set screw 244 and the adjustment of the arc of the swing of the table to control the adjustment for the inclined cut is effected by means of the set screw 245.

The swinging table carries on its top face the rails 85 that support the base plate of the head stock, so that by oscillating the table the head stock is positioned in the two angular positions requisite for the duplex cutting operations.

The mechanism for swinging the table comprises an actuator in the form of a case 247 made in two sections and secured together. The case is pivoted on a pivot pin 248 supported in an extension 249 of the bed plate. The extension 249 also constitutes a ledge on which the actuator moves so as to keep the end thereof in alinement with the face of the operating cam. The actuator case has mounted thereon a plunger 250 that is connected with the case by a pin 251 supported by the walls of the case, and extending through a slot 252 in the plunger. An expansion spring 253 is mounted in the case back of the plunger head and is adjusted by means of a follow piece 254 controlled by a set screw 255 extended through a threaded opening in the end of the case. The plunger carries at its outward end a cam roller 256 that operates against the face of a cam 257. The cam 257 is mounted on the end of the shaft 136, being releasably locked thereon by a nut 258. The shaft 136 is in a bearing supported by the table of the machine so that when the table is swung to one side the actuator moves on its pivot 248 to hold the cam roller in alinement with the cam face, the free end of the actuator being controlled by a retractile spring 259, secured at one end to the actuator case, and at the other end to a bracket 260 supported by the bed of the machine.

The actuator case carries a lug 261 that cooperates with a latch lever 262 to hold the swinging table in straight adjustment. The latch lever 262 is pivoted on a pivot screw 263 that threads into an eccentric bushing 264 mounted in the end of the table. The eccentric bushing provides an adjustment for the latch lever so as to aline the table. After adjustment the bushing may be locked by a screw 265 extending through a slot in the flange of the bushing, and threaded into an opening in the end of the table.

The locking lever 262 has an extending arm 266 that terminates adjacent to the side face of the cam 257.

The face of the cam 257 is developed on a curve with gradually increasing radii forming a cam shoulder 267. As the cam rotates in the direction indicated by the arrow, the plunger 250 is moved within the actuator case, tensioning the spring 253. The cam 257 carries a pin 268 adapted to raise the arm 266 to release the latch 261—262.

A retractile spring 269 is engaged at one end in an eye 270, carried by a bracket 271 supported by the stationary knee of the machine and at the other end, in an adjustable eye bolt 272 supported in a bracket 273 attached to the side of the table of the machine. The tension of the spring 269 is adjustable by means of the eye bolt. The tendency of the spring 269 is to move the table into straight adjustment with the bed plate of the machine.

When the latch device 261—262 is released sufficient power has been stored in the spring 253 to overcome the tension of the spring 269, and the table is forced laterally by the pressure of the cam roller against the cam face. The tension in the spring 253 is maintained at a sufficient power to hold the table in lateral adjustment during the travel of the cam roller 256 over the cam face from the point of the release of the latch until the cam roller rides from the shoulder 267 of the cam. When the cam roller 256 rides into the depression in the cam at the base of the cam shoulder 267 the tension on the spring 253 is released, whereupon the spring 269 functions to return the table to straight adjustment, the latch 261—262 engaging and locking the table in this adjustment.

The oscillating mechanism for the swinging table is timed so that the straight adjustment of the table will be maintained during the straight edge cutting operation, both for the entering cut and for the completion of the cut. In this adjustment the axis of the work is in alinement with the axis of the cutter spindle, so that the cutter cuts on a line perpendicular to the axis of the ring pot. At the completion of the straight edge cut, the table moves laterally in an arc, the center of which is perpendicular to the axis of the saw spindle. The length of the arc is controlled by the adjusting screw 245 so that when the table has reached its limit of lateral movement, the axis of the work will form an angle with the axis of the saw spindle equal to the angle of cut, thereby maintaining the cutting edge of the cutter in parallel alinement with the edge of the cut perpendicular to the axis of the work. During the operation for forming the inclined cut the angle of the cut is maintained by the adjustment of the table. As the inclined cut is developed, the cutter spindle moves forward to compensate for the increasing width of the wall of the ring blank from an entering point of the cut to the point of completion thereof. This forward movement of the cutter spindle preserves the axis of the cutter in angular adjustment with the axis of the work, substantially equal to the angle of cut, so that the edges of the cut will be formed perpendicular to the axis of the work, preventing the cutter from binding between the side edges of the cut, and also permitting the cutter to be readily removed from the cut upon the completion thereof by the depression of the head of the machine. Since the axis of the cutter spindle and of the work is adjusted co-ordinately with the angle of the cut, the angle of contact between the cutting edge of the cutter and the work will be slightly in excess of the axial angle formed by the axis of the cutter spindle and of the work; but, inasmuch, as the cutter has a slight spring, and since there is a longitudinal pressure at the cutting point, there will be a tendency to spring the cutter sufficiently so that the cutting angle will approximate, very closely, the angle of adjustment between the cutter spindle and the axis of the work. The angle at the point of contact between the cutter and the work, in ordinary cutting operations, will not exceed the angle of the cutter spindle and the work by more than two or three degrees, within which limits the cutter will cut a substantially vertical edge, and will not have any appreciable tendency to bind in the inclined cut.

*Automatic stop mechanism.*—The operation of the machine is controlled by a belt shifting device which shifts the power belt 4 from the loose pulley 7 to the power pulley 8. The belt shifter is provided with an automatic release for stopping the machine that is under the control of the head stock so that when the head stock has reached its forward limit after the ring pot has been cut into the ring blanks, the operation of the machine will be stopped.

The device includes a rectangular rod 274 extending through and mounted in the walls of the housing 2 of the machine. Near the rear extremity of the rod is a pair of spaced arms 275 extending at each side of the belt. A retractile spring 276 is secured at one end to a bracket 277 bolted to the housing 2 and extending rearwardly therefrom, and at the other end to an arm 278 extending from the rod 274 adjacent to the front end thereof. The tendency of the spring is to move the rod 274 rearwardly and thereby shift the belt from the power pulley 8 to the loose pulley 7. On the under face of the rod 274 is an elongated lug 279 that co-operates with a pivoted locking lever 280, the lever 280 being mounted on a pivot pin 281 secured to the front wall of the housing. The free end of the locking lever 280 is actuated to raised adjustment by a leaf spring 282, secured at one end to the lever, and abutting at the other end against an abutment 283 secured on the front wall of the housing. A handle 284 is provided near the front end of the rod 274 for manual engagement, for pulling the rod forward and manually shifting the belt from the loose pulley to the power pulley. When the rod has been drawn forward a distance sufficient to shift the belt, the free end of the locking lever 280 engages behind the lug 279 and holds the parts in operative adjustment. A releasing device comprising a bell-crank lever 285 is pivoted on a rod 286 supported by a bracket 287 secured to the housing 2 of the machine. One end of the bell-crank lever engages with a push rod 288 slidably mounted in a support secured to the front face of the housing 2 of the machine. The other arm of the bell-crank lever is provided with an adjustable abutment screw 289, which is in alinement with a bracket 290 secured to the base piece of the head stock. When the head stock has moved to its forward limit toward the cutter, the bracket 290 contacts with the abutment screw 289, rocking the bell-crank lever 285, thereby raising the push rod 288 and depressing the free end of the locking lever 280. This operation releases the latched engagement of the rod 274, whereupon the rod is moved rearwardly by the spring 276, shifting the belt to the loose pulley and stopping the operation of the machine. The point of release may be adjusted within limits by the adjustable abutment screw 289, so that when the ring pot has been cut into ring blanks to the point adjacent to the flange of the ring pot, the operation of the machine will automatically cease for the renewal of the work.

*Operation.*—From the foregoing description, the construction of the machine may be understood, as well as the functioning and the co-functioning of the different mechanisms. The following is a brief summary of the operation of the machine. The work in the form of the ring pot 80 is adjusted and alined in the chuck and the head stock moved forward by the hand wheel 186 until the forward edge of the ring pot is in alinement with the cutting edge of the cutter, the feeding pawl 190 being set in engagement with the ratchet wheel 188. In this adjustment, the swinging table is in straight alinement with the bed of the machine. When power is applied to the machine by drawing the rod 274 forward by the handle 284, the cutter spindle support raises into contact with the ring pot, the chuck remaining stationary during the entering cut of the cutter into the ring blank. The chuck, through the operation of the mechanism for rotating the chuck spindle 90, is revolved a slight distance in excess of a complete circle, which performs a straight edge cut 29 on the ring blank. After the complete cut through the wall of the ring pot, the chuck spindle support is carried downwardly by the saw positioning mechanism, through a depression of the head of the machine, thereby carrying the cutter out of contact with the ring pot. The feeding mechanism thereupon advances the head stock of the machine a graduated distance equal to the width of the wall of the ring blank, between the inclined cut and the front face of the ring blank. During the feeding operation the chuck is locked against rotation. The chuck remains locked against rotation as the cutter is raised into contact with the ring pot for the entering cut of the inclined cut, the table having swung to its lateral adjustment immediately upon completion of the straight edge cut by the operation of the table positioning mechanism. The cutter enters the ring pot wall at an angle for the initial cut of the inclined cut, and after it has cut through the wall of the ring pot, the chuck spindle is operated revolving the ring pot in the length of the segment of the inclined cut 292 in the ring blank. During the operation for forming the inclined cut the cutter spindle is gradually moved longitudinally of the ring pot. After the inclined cut has been completed the rotation of the chuck is stopped and the cutter withdrawn from the cut by the depression of the machine head, through the cutter positioning mechanism. As soon as the inclined cut has been completed the table swings back to the straight adjustment, and the feeding mechanism advances the ring pot longitudinally a sufficient distance to compensate for the longitudinal movement of the cutter plus the width of the wall of the ring blank from the point of termination of the inclined cut to the rear face 293 of the ring blank, whereupon the cycle of operations continues until the ring pot has been advanced and formed into ring blanks, whereupon the machine is automatically stopped. After the ring blanks have been severed from the ring pots they automatically gather on the shield 76, from which they may be removed when the machine is re-set.

It will be understood that the machine produces the product illustrated in Fig. 43 and that, in order to complete the ring, additional machining operations are necessary such, for instance, as cutting the ends of the ring and forming a notch therein. The complete function of the machine is accomplished when the rings are cut from the pot and the inclined cut made therein, as above described.

It will be observed that the machine is provided with the necessary adjustments to adapt it for cutting rings of different diameters, and for varying both the length and angle of the angular cut.

While I have embodied the invention in a machine designed especially for cutting ring blanks, it is obvious that the machine may be utilized for producing other products.

I am aware that the construction may be varied in numerous details without departure from the spirit and scope of the invention. I do not limit myself therefore, to the exact construction shown and described, but what I claim and desire to secure by Letters Patent is:

1. In a machine of the character described, the combination of a work supporting chuck, power mechanism for revolving the chuck, a cutter spindle, a cutter carried by said spindle, means for raising and lowering said spindle to move the cutter into and out of contact with the work, automatic means for moving the chuck longitudinally in respect of the cutter, and automatic means for moving the chuck laterally in respect of the cutter to change the angle between the chuck and cutter.

2. In a machine of the character described, the combination of a frame, with a head vertically movable in said frame, a cutter spindle revolubly supported in said head carrying a cutter, means for revolving said spindle, means for raising and lowering said head, a work supporting chuck, means for revolving said chuck, automatic means for changing the angle of the axis of the chuck and cutter spindle, and automatic means for feeding said chuck towards said spindle.

3. In a machine of the character described, the combination with a revoluble cutter spindle carrying a cutter, of a head stock movable to and away from said spindle, a revoluble chuck spindle mounted in said head stock, a swinging support for said head stock, and automatic means for oscillating said support, whereby the work will be presented to the cutter at different angles.

4. In a machine of the character described, the combination of a revoluble chuck adapted to support a cylindrical ring pot, means for revolving said chuck, a cutter, means for positioning said cutter to cut the work in alinement with the axis thereof, and positioning means whereby the cutter will cut the work at an angle to the axis thereof.

5. In a machine of the character described, the combination with a frame, of a head vertically movable in said frame, a cutter spindle adapted to carry a cutter mounted in said head, means for raising and lowering said spindle, means for moving said spindle longitudinally of its axis, a revoluble chuck adapted to support the work and to revolve it in contact with the cutter and means for moving the chuck laterally in respect of the cutter to present the work thereto at different angles.

6. In a machine of the character described, the combination with a revoluble cutter spindle, of positioning means for said cutter spindle, a revoluble chuck, a support for said chuck, means for automatically changing the angle of said support, and mechanism for advancing the support to the cutter.

7. In a machine of the character described, the combination with a cutter spindle, carrying a cutter, of a work supporting chuck the axis of which is parallel with the axis of said cutter spindle, automatic means for changing the alinement of the axis of the work supporting chuck in respect of the axis of the cutter spindle, and operating mechanism for said chuck.

8. In a machine of the character described, the combination with an adjustable spindle and a cutter carried by said spindle, of means for positioning said spindle, a revoluble work supporting chuck, power mechanism for revolving said chuck, a connection in said mechanism for controlling the rotation of said chuck, and means for controlling said connection whereby the rotation of said chuck will be timed with the spindle positioning means for cutting operations whereby said chuck will be revolved different distances while in contact with the work.

9. In a machine of the character described, the combination with a cutter, of a spindle for supporting said cutter, means for moving said spindle vertically, a revoluble chuck for supporting a cylindrical ring pot, means for moving said chuck longitudinally, means for positioning said chuck for changing the axis of revolution of the ring pot in respect to the axis of the revolution of the cutter, and an automatic stop device for stopping the operation of the machine at the end of the forward movement of the chuck.

10. In a machine of the character described, the combination of a frame, with a vertically movable head mounted in the frame, a cutter spindle revolubly mounted in said head, power mechanism for operating said cutter spindle, a head stock, a chuck spindle mounted in said head stock, a chuck supported by said chuck spindle adapted to support the work in the form of a cylindrical ring pot, power connections for driving said chuck spindle, a lock device for preventing the return rotation of said chuck, and means for controlling said power connections for said chuck spindle for timing the rotation of the chuck in co-ordination with the means for positioning said cutter spindle.

11. In a machine of the character described, the combination of a stationary support, a power shaft mounted in said support, a vertically movable head mounted in said support, a cutter spindle revolubly carried in said head, a cutter carried by said spindle, driving connections between the power shaft and the spindle for rotating the cutter spindle, means for raising said head in said support, a carriage, a revoluble chuck mounted in said carriage, means for advancing the chuck to the cutter, means for automatically changing the axis of the chuck in respect of the axis of the cutter, and power connections with the power shaft for revolving said chuck.

12. In a machine of the character described, the combination with a stationary support, of a vertically movable head mounted in said support, a spindle carried by said head, a power shaft journaled in said support, speed increasing driving connections between the power shaft and the spindle, means for raising and lowering the head of the machine, a work supporting chuck, a support for said chuck movable longitudinally to and away from said spindle, speed reducing driving connections for the chuck from the power shaft for revolving the chuck in the opposite direction from the spindle, and a clutch device for timing the operation of the chuck.

13. In a machine of the character described, the combination with a stationary frame, of a vertically movable head mounted in said frame, a spindle support mounted in said head, a cutter spindle carried by said support, a cutter carried by said spindle, a spring for depressing said head in said support, means for raising said head in opposition to said spring, and mechanism operable to move said spindle support longitudinally of its axis, and means for supporting work in co-operative relationship with said cutter.

14. In a machine of the character described, the combination with a stationary support, of a vertically movable head mounted in said support, a spindle carried by said head, a cutter carried by said spindle mechanism for revolving said spindle, a pivoted support carried by said stationary support swinging on a pivot at right angles to the axis of the spindle, a carriage carried by said swinging support, a chuck spindle mounted in said carriage, means for operating said chuck spindle, a chuck carried by said chuck spindle for supporting the work, and automatic means for oscillating said swinging support for presenting the work to the cutter at different angular positions.

15. In a machine of the character described, the combination with a support for supporting a tube, of means for cutting the tube parallel to the edge thereof, through the complete circumference of the work, means for cutting a slot in said work inclined with respect to the edge of the work, and means for feeding the work after each cutting operation.

16. In a machine of the character described, the combination of a work support, a cutter, mechanism for operating the cutter and means for co-ordinating the support and said cutter, whereby ring blanks having parallel edges are cut from a tube, and an inclined slot formed therein intermediate the parallel edges of said ring blanks.

17. In a machine of the character described, the combination with a cutter, of a work carriage, a table for supporting said carriage, a stationary frame, a pivot between the frame and said table, whereby the angle of inclination of said table and said cutter may be varied, means for rotating the work carried by said carriage, whereby said cutter will cut the work parallel to the edge thereof, means for feeding the carriage toward the cutter, means for changing the angle of said table with respect to said cutter, and means for rotating said work a pre-determined distance whereby the cutter will form a slot of a pre-determined length in the work inclined with respect to the edge thereof.

18. In a machine of the character described, the combination of a work support, with a cutter operable to cut pieces from the work with parallel side edges, mechanism for changing the adjustment of the work support, means for moving the cutter longitudinally of the work to form a cut in each piece at an inclination to the edges thereof, mechanism for rotating the cutter, and means for feeding the work to the cutting positions.

19. In a machine of the character described, the combination of a work support, a cutter, mechanism for operating the cutter and means for co-ordinating the support and said cutter, whereby ring blades having parallel edges are cut from a tube, and a slot formed therein intermediate the parallel edges of said ring blanks.

20. In a machine of the character described, the combination of a work support, with a cutter operable to cut pieces from the work with parallel side edges, means for moving the cutter longitudinally of the work to form a cut in each piece at an inclination to the edges thereof, mechanism for rotating the cutter, and means for feeding the work to the cutting positions.

21. In a machine of the character described, the combination of a work support with a revoluble cutter, a device for holding the work support in a position so that the cutter will cut pieces from the work with parallel side edges and to change the angle of said work support whereby the cutter will cut a slot in each piece of the work at an inclination to the edges thereof, means for advancing the cutter longitudinally of the work during the cutting of the inclined slot, means for returning the cutter to normal position after the cutting operation for forming the inclined slot, and mechanism for feeding the work after each cutting operation.

22. In a machine of the character described, the combination of a pivoted table, a work supporting chuck slidably mounted on the table, power mechanism for revolving the chuck, automatic mechanism for controlling the chuck operating mechanism, means for swinging the table, a cutter spindle, a cutter carried by said spindle, mechanism for raising and lowering the spindle to move the cutter into and out of contact with the work, and mechanism for advancing the chuck on the table to the work.

23. In a machine of the character described, the combination of a table, a support movable with respect to the table, a chuck spindle mounted in said support, a work supporting chuck carried by said chuck spindle, power mechanism for operating said chuck spindle, a cutter spindle, a cutter carried by said spindle, means for raising and lowering said spindle to move the cutter into contact with the work, a device for operating said table to vary the angle of the chuck in respect of the cutter, and means for effecting a longitudinal movement of the cutter spindle in cutting operations.

24. In a machine of the character described, the combination of a frame, with a head vertically movable in said frame, a cutter spindle revolubly mounted in said head, a cutter carried by said spindle, mechanism for operating said spindle, means for raising and lowering said head, a swinging table, a work supporting chuck supported by said table, means for operating the chuck, and automatic means for effecting the swinging of said table.

25. In a machine of the character described, the combination with a revoluble cutter, of a head stock movable longitudinally with respect to said cutter, a revoluble work supporting chuck, a swinging support for said chuck, automatic means for oscillating said support, and means for moving said chuck longitudinally.

26. In a machine of the character described, a stationary frame, a head vertically movable in the frame, a cutter spindle supported in the head, a cutter carried by said spindle, a power shaft, connections for rotating said cutter spindle, a cam for raising and lowering the head, connections for operating said cam from said power shaft, a work supporting chuck, automatic means for swinging the chuck laterally and means for moving said chuck longitudinally to hold the work in cutting position with respect to said cutter.

27. In a machine of the character described, the combination of a frame, a head vertically movable in the frame, a spring adapted to actuate said head to depressed position, a cutter spindle revoluble mounted in the head, a cutter carried by said spindle, a cam for raising the head, a power shaft, connections between the power shaft and said cutter spindle, a work supporting chuck, means for moving the chuck laterally, and means for moving said chuck longitudinally to support the work in operative positions with respect to said cutter.

28. In a machine of the character described, the combination with a frame, of a vertically movable head mounted in the frame, a cutter spindle revolubly mounted in the head, a power shaft, connections between the power shaft and said cutter spindle, a cam, connections between said cam and said power shaft, a spring for actuating said head to depressed position, connections between the cam and head whereby said head may be raised, a device for moving the cutter spindle longitudinally in the head, a work supporting chuck, and means for moving said chuck to hold the work in operative cutting positions with the cutter.

29. In a machine of the character described, the combination of a frame, a vertically movable head mounted in the frame, a cutter spindle carried by said head, a cutter carried by said spindle, power mechanisms for revolving said cutter spindle, a chuck, a support for said chuck, and a power connection for revolving said chuck in contact with the cutter including a device whereby the chuck is revolved different distances for duplex cutting operations.

30. In a machine of the character described, the combination with a stationary frame, of a head vertically movable in the frame, means for raising and lowering the head, a cutter spindle mounted in said head, mechanism for operating the cutter spindle, a swinging table, a head stock slidably mounted on said table, a chuck supported in said head stock, mechanism for swinging said table, and an automatic feed device for moving said head stock longitudinally of said table to bring the work in operative positions with the cutter.

31. In a machine of the character described, the combination of a work supporting chuck, a power shaft, speed reducing mechanism for rotating said chuck from the power shaft, a clutch for controlling the rotation of said chuck including automatic means whereby the chuck is revolved varying distances for duplex cutting operations, a cutter spindle, a cutter carried by said spindle, and means for moving said cutter vertically into and out of contact with the work.

32. In a machine of the character described, the combination of a work supporting chuck, a power shaft, connections between the power shaft and chuck for rotating said chuck, a clutch in said connections for controlling the rotation thereof, and automatic mechanism for controlling said chuck whereby the chuck is revolved a varying distance for duplex cutting operations.

33. In a machine of the character described, the combination of a work supporting chuck, a power shaft, connections between the power shaft and chuck for rotating said chuck, a cutter, means for changing the angle between the chuck and cutter, and mechanism for controlling the rotation of the chuck whereby it will be rotated a pre-determined distance when the chuck is in one angular position and a different distance when the chuck is in its other angular position.

34. In a machine of the character described, the combination of a frame, with a head movable in said frame, a cutter supported by said head, a chuck for supporting the work, means for moving the cutter into contact with the work, and means for revolving the chuck different distances while in contact with the work.

35. In a machine of the character described, the combination with a revoluble spindle, a cutter carried by said spindle, of a carriage movable to and away from said cutter, a revoluble chuck spindle mounted in said carriage, a swinging support for said carriage, means for limiting the swinging movement of said support, and automatic means for moving said support whereby the work will be presented to the cutter at different angles.

36. In a machine of the character described, the combination with a revoluble cutter spindle, a cutter carried by said spindle, of a carriage movable to and away from said spindle, a revoluble chuck spindle mounted in the carriage, a swinging support for said carriage, means for limiting the swinging movement of said support, automatic means for moving said support, and means for moving said cutter spindle longitudinally when the support is in one of its angular positions.

37. In a machine of the character described, the combination with a frame, of a head vertically movable in the frame, means for raising and lowering said head, a cutter spindle, a cutter carried by said spindle, means for moving said spindle longitudinally of its axis upon each alternate raising of the head, and a revoluble chuck to support the work and revolve it in contact with the cutter.

38. In a machine of the character described, the combination with a frame, of a head vertically movable in said frame, a cutter carried by said head, a power shaft journaled in said frame, power connections between said power shaft and said cutter, a vertical shaft journaled in said frame, power connections between the power shaft and said vertical shaft, a cam shaft journaled in said frame, power connections between said vertical shaft and said cam shaft, and connections between said cam and said head for raising the head at timed intervals.

39. In a machine of the character described, the combination of a frame, a head vertically movable in the frame, a cutter spindle support mounted in said head and longitudinally movable therein, a cutter spindle mounted in said support, a cam shaft, a power shaft operatively connected with said cam shaft, a cam carried by said cam shaft adapted to raise said head, a second cam carried by said cam shaft, and connections between said second named cam and said spindle support whereby said spindle support is moved longitudinally upon each alternate upward movement of the head.

40. In a machine of the character described, the combination with a frame, of a head vertically movable in the frame, a power shaft journaled in the frame, a cutter spindle mounted in said head, gear connections between the power shaft and the cutter spindle, a cam shaft journaled in said frame, connections between the cam shaft and the head whereby the head is raised at timed intervals, gear connections between said power shaft and said cam shaft comprising an upright shaft, a worm carried by said power shaft, a gear carried by said upright shaft meshing with said worm, a beveled pinion carried by said upright shaft, a beveled gear carried by said cam shaft meshing with said beveled pinion, and an actuator for moving said cutter spindle longitudinally.

41. In a machine of the character described, the combination with a frame, of a head vertically movable in the frame, a power shaft journaled in the frame, a cutter spindle support mounted in said head and movable longitudinally therein, resilient means actuating the spindle support to one position, a cam shaft, means for driving said cam shaft from the power shaft, a cam on said cam shaft, and a cam plate having operative connection with said cam for moving said spindle support longitudinally in opposition to said resilient means.

42. In a machine of the character described, the combination with a frame, of a head vertically movable in the frame, a power shaft journaled in the frame, a cutter spindle support mounted in said head and movable longitudinally therein, resilient means actuating the spindle support to one position, a cam shaft, means for driving said cam shaft from the power shaft, a cam on said cam shaft, a cam plate having operative connection with said cam for moving said spindle support longitudinally in opposition to said resilient means, and a latch device for holding said spindle support in the position to which it is moved by said cam plate.

43. In a machine of the character described, the combination with a frame, of a head vertically movable in the frame, a power shaft journaled in the frame, a cutter spindle support mounted in said head and movable longitudinally therein, resilient means actuating the spindle support to one position, a cam shaft, means for driving said cam shaft from the power shaft, a cam on said cam shaft, a cam plate having operative connection with said cam for moving said spindle support longitudinally in opposition to said resilient means, a latch device for holding said spindle support in the position to which it is moved by said cam plate, and means for releasing said latch device.

44. In a machine of the character described, the combination with a frame, of a head vertically movable in the frame, means for raising and lowering said head, a cutter spindle, a cutter carried by said cutter spindle, means for moving said spindle longitudinally of its axis upon each alternate raising of the head, a revoluble chuck to support the work and revolve it in contact with the cutter, and means for timing the extent of revolution of said chuck.

45. In a machine of the character described, the combination with a frame, of a head vertically movable in said frame, a cutter carried by said head, a power shaft journaled in said frame, power connections between said power shaft and said cutter, a vertical shaft journaled in said frame, power connections between the power shaft and said vertical shaft, a cam shaft journaled in said frame, power connections between said cam and said head for raising the head at timed intervals, a work support, and means for moving said work support after the head has been raised to bring the cutter in contact with the work.

46. In a machine of the character described, the combination with a frame, of a head vertically movable in the frame, a power shaft journaled in said frame, a cutter spindle, a cam shaft journaled in the frame, gear connections between said power shaft and said cam shaft, a cam carried by said cam shaft for raising said head at timed intervals, a work support, and means for moving said work support at timed intervals when the cutter has been raised into contact with the work.

47. In a machine of the character described, the combination with a frame, of a head vertically movable in the frame, a cutter spindle support mounted in said head and longitudinally movable therein, a cutter spindle mounted in said support, a cam shaft, a power shaft operatively connected with said cam shaft, a cam carried by said cam shaft adapted to raise said head, a second cam carried by said cam shaft, connections between said second named cam and said spindle support whereby said spindle support is moved longitudinally upon each alternate upward movement of the head, a chuck, and means for revolving said chuck when the head is raised.

48. In a machine of the character described, the combination with a frame, of a head vertically movable in the frame, a power shaft journaled in the frame, a cutter spindle mounted in said head and movable longitudinally therein, resilient means actuating the spindle support to one position, a cam shaft, means for driving said cam shaft from the power shaft, a cam on said cam shaft, a cam plate having operative connection with said cam for moving said spindle support longitudinally in opposition to said resilient means, a work support, and means for moving the work support a pre-determined distance when the cutter spindle support is idle, and a different distance when said support is moved longitudinally.

49. In a machine of the character described, the combination with a stationary frame, of a head vertically movable in the frame, means for raising and lowering the head, a cutter spindle mounted in said head, mechanism for rotating the cutter spindle, a swinging table, a head stock slidably mounted on said table, a chuck supported in said head stock, mechanism for swinging said table comprising a spring, an actuator operating in opposition to said spring including a case, a plunger mounted in said case, a cam roller carried by said plunger, a cam cooperating with said roller, and power connections between the power shaft of the machine and said cam.

50. In a machine of the character described, the combination of a frame, a cutter supported by the frame, a bed plate, a carriage movable on said bed plate toward and away from said cutter, a chuck in said carriage, and automatic mechanism for advancing the carriage toward the cutter varying distances after each alternate cutting operation.

51. In a machine of the character described, a cutter, a work supporting chuck movable longitudinally with respect to the cutter, and automatic mechanism for feeding said chuck towards said cutter varying distances at pre-determined points in the cycle of operation of said machine.

52. In a machine of the character described, the combination of a frame, a head movable in said frame, a cutter supported by said head, a carriage movable longitudinally and laterally with respect to said cutter, a chuck in said carriage, automatic mechanism for moving said carriage laterally after each cutting operation, and feeding mechanism for advancing said carriage longitudinally after each cutting operation.

53. In a machine of the character described, the combination of a cutter, a carriage movable toward and away from said cutter, a chuck in said carriage, manual mechanism for moving said carriage, and an automatic feeding mechanism for advancing the carriage to said cutter varying distances after each cutting operation.

54. In a machine of the character described, the combination of a frame, a cutter supported by said frame, a carriage supported by the frame and movable toward and away from said cutter, a chuck in said carriage, a power shaft operatively connected with the cutter, feeding mechanism for advancing said carriage towards said cutter including a cam, driving connections from the power shaft to said cam, a flexible connection operated by said cam, and devices connected with said flexible connection for stepping said carriage forward after each cutting operation.

55. In a machine of the character described, the combination with a cutter, of a carriage movable toward and away from said cutter, a chuck in said carriage, feeding mechanism for advancing said carriage towards said cutter, and a cam driven by the power shaft of the machine for actuating said feeding mechanism whereby said carriage will be advanced to said cutter varying distances after each cutting operation.

56. In a machine of the character described, the combination with a frame, of a head supported in the frame, a cutter mounted in said head, a carriage movable toward and away from said cutter, a chuck supported by the carriage, a shaft mounted in the frame, a rack and pinion connection between said shaft and said carriage, manual means for rotating said shaft and thereby moving said carriage in either direction, a ratchet wheel carried by said shaft, swinging arms supported by said shaft, a latch supported by said swinging arms and adapted to co-operate with said ratchet, a spring for actuating said arms in one direction, and timed mechanism co-operating with said spring for swinging said arms and thereby advancing the carriage stepped distances after each cutting operation.

57. In a machine of the character described, the combination with a frame, of a head movable in said frame, a cutter carried in the head, a carriage movable toward and away from said cutter, a chuck supported by said carriage, manual mechanism for moving said carriage in the frame, and an automatic feeding device for moving said carriage towards said cutter predetermined distances after each cutting operation, said devices including an adjustment for determining the extent of forward movement of said carriage.

58. In a machine of the character described, the combination of a frame, a revoluble cutter supported by the frame, a carriage movable toward and away from said cutter, a chuck in said carriage, a shaft operatively connected with said carriage for moving said carriage in the frame, automatic mechanism for revolving said shaft a predetermined distance after each cutting operation for advancing the work to the cutter, and a latch device preventing retrograde movement of the carriage from the cutter.

59. In a machine of the character described, the combination with a stationary frame, of a swinging table, a pivot connection between the table and frame, a carriage movable on said table, a work supporting chuck mounted in said carriage, a cutter adapted to be moved into contact with the work supported by the chuck, the axis of the cutter being at right angles to axis of the pivot, mechanism for swinging said table comprising a spring, an actuator operating in opposition to said spring, a cam co-operating with said actuator to swing the table in opposition to the spring, a latch device for holding said table, and means for releasing said latch device permitting said actuator to operate the swinging table.

60. In a machine of the character described, a frame, a table pivoted to said frame, a work supporting chuck supported by said table, adjustable means for limiting movement of the table, a cutter, mechanism for moving said table comprising a spring for actuating the table in one direction, a spring actuated plunger for moving the table in the other direction, a cam co-operating with said plunger, connections between said cam and the power shaft of the machine, and releasable latch device operable to permit the plunger to operate to swing the table at a predetermined point in the cycle of operation of the machine.

61. In a machine of the character described, the combination of a frame, a table supported by the frame and movable laterally with respect thereto, means for limiting the extent of movement of said table, a cutter, a power shaft, a chuck supported by said table, a spring for actuating said table in one direction, a timed actuator, and a cam for controlling the actuator, connections between the power shaft and said cam whereby said table is moved in opposition to said spring at a predetermined point in the cycle of operation of said machine.

62. In a machine of the character described, the combination of a frame, a cutter supported by the frame, a bed plate, means for moving said bed plate laterally in said frame, a carriage movable on said bed plate toward and away from said cutter, a chuck mounted in said carriage, automatic mechanism for advancing said carriage toward said cutter a pre-determined distance after each cutting operation, and an adjustment in said mechanism to determine the extent of movement thereof.

63. In a machine of the character described, the combination of a frame, a cutter supported by the frame, a bed plate, a carriage movable on said bed plate toward and away from said cutter, a chuck mounted in said carriage, feeding mechanism for moving said carriage, and automatic mechanism for operating said feeding mechanism for advancing the carriage toward the cutter varying distances after each alternate cutting operation.

64. In a machine of the character described, the combination with a cutter, of a work supporting chuck movable longitudinally with respect to the cutter, mechanism for feeding said chuck towards said cutter, an actuator, a power shaft, and driving connections between the power shaft and the actuator whereby said chuck is advanced varying distances at pre-determined points in the cycle of operation of said machine.

65. In a machine of the character described, the combination of a frame, a head movable in said frame, a cutter supported by said head, a carriage movable longitudinally and laterally with respect to said cutter, a chuck mounted in said carriage, automatic mechanism for moving said carriage laterally after each cutting operation, adjustable means for limiting the lateral movement of the carriage, and feeding mechanism for advancing said carriage longitudinally after each cutting operation.

66. In a machine of the character described, the combination of a cutter, means for moving the cutter longitudinally of the work in certain cutting operations, a carriage movable toward and away from said cutter, a work support in said carriage, manual mechanism for moving said carriage, and an automatic feeding mechanism for advancing the carriage to said cutter varying distances after each cutting operation.

67. In a machine of the character described, the combination of a frame, a cutter supported by said frame, a carriage supported by the frame and movable toward and away from said cutter, a work support in said carriage, a power shaft operatively connected with the cutter, a device for moving said cutter longitudinally in certain cutting operations, feeding mechanism for advancing said carriage towards said cutter including a cam, driving connections from the power shaft to said cam, a flexible connection operated by said cam, and devices connected with said flexible connection for stepping said carriage forward after each cutting operation.

68. In a machine of the character described, the combination with a cutter, and mechanism for moving the cutter longitudinally for certain cutting operations, of a carriage movable toward and away from said cutter, a work support in said carriage, feeding mechanism for advancing said carriage towards said cutter, and a cam driven by the power shaft of the machine for actuating said feeding mechanism whereby said carriage will be advanced to said cutter varying distances after each cutting operation to compensate for the longitudinal movement of the cutter.

69. In a machine of the character described, the combination with a frame, of a head supported in the frame, a cutter mounted in said head, a device for moving the cutter endwise in the head, a carriage movable toward and away from said cutter, a chuck supported by the carriage, a shaft mounted in the frame, a rack and pinion connection between said shaft and said carriage, manual means for rotating said shaft and thereby moving said carriage in either direction, a ratchet wheel carried by said shaft, swinging arms supported by said shaft, a pawl supported by said swinging arms and adapted to co-operate with said ratchet, a spring for actuating said arms in one direction, and timed mechanism co-operating with said spring for swinging said arms and thereby advancing the carriage different distances after each alternate cutting operation.

70. In a machine of the character described, the combination with a frame, of a head movable in said frame, a cutter carried in the head, means for moving the cutter endwise in the head, a carriage movable toward and away from said cutter, a chuck supported by said carriage, manual mechanism for moving said carriage in the frame, and an automatic feeding device for moving said carriage towards said cutter predetermined distances after each cutting operation, said devices including an adjustment for determining the extent of forward movement of said carriage.

71. In a machine of the character described, the combination of a frame, a revoluble cutter supported by the frame, means for moving the cutter endwise for certain cutting operations, a carriage movable toward and away from said cutter, a work support in the carriage, a shaft operatively connected with said carriage for moving said carriage in the frame, automatic mechanism for revolving said shaft a different predetermined distance after each alternate cutting operation for advancing the work to the cutter, and a latch device preventing retrograde movement of the carriage from the cutter.

72. In a machine of the character described, the combination with a cutter, of a revoluble chuck, driving connections for driving said chuck including a clutch, a spring for moving said clutch into engagement, an actuator for disengaging said clutch, a cam for operating said actuator to disengage the clutch, and a latch device releasable to permit said actuator to operate at timed intervals in the cycle of rotation of said chuck.

73. In a machine of the character described, the combination with a cutter, of a swinging table, a chuck supported by said table and movable longitudinally thereon, a power shaft, driving connections from said power shaft to said chuck whereby the chuck may be rotated in any of its positions, and a device operable to disengage said power connections at timed intervals.

74. In a machine of the character described, the combination of a cutter, a chuck operable to support work in operative engagement with said cutter, means for moving the chuck laterally, driving connections for rotating the chuck in either of its lateral positions, and a latch device for preventing the return rotation of said chuck.

75. In a machine of the character described, the combination with a cutter, of a chuck spindle, a chuck supported by said spindle, driving connections between said chuck spindle and the power shaft of the machine comprising a flexible shaft geared to the power shaft, gearing between said flexible shaft and the chuck spindle, a clutch for operatively connecting said gearing with said flexible shaft, an actuator for said clutch, and means for controlling said actuator whereby said clutch is disengaged at timed intervals.

76. In a machine of the character described, the combination with a cutter, of a revoluble chuck, driving connections for driving said chuck including a clutch, means for actuating said clutch to engagement, an actuator for disengaging said clutch, a cam for operating said actuator to disengage the clutch, and a latch device releasable to permit said actuator to operate at timed intervals in the cycle of rotation of said chuck.

77. In a machine of the character described, the combination with a cutter, of a swinging table, a chuck supported by said table and movable longitudinally thereon, a power shaft, driving connections from said power shaft to said chuck whereby the chuck may be rotated in any of its positions, a clutch in said connections, means normally actuating said clutch to engagement, and a spring operated actuator operable to disengage said clutch at timed intervals.

78. In a machine of the character described, the combination of a cutter, a chuck operable to support work in operative engagement with said cutter, means for moving the chuck laterally, driving connections for rotating the chuck in either of its lateral positions, a latch device for preventing the return rotation of said chuck, a clutch in said connections, and means for operating said clutch.

79. In a machine of the character described, the combination with a cutter, of a chuck spindle, a chuck supported by said spindle, driving connections between said chuck spindle and the power shaft of the machine comprising a flexible shaft geared to the power shaft, gearing between said flexible shaft and the chuck spindle, a clutch for operatively connecting said gearing with said flexible shaft, and means for engaging and disengaging said clutch at timed intervals.

80. In a machine of the character described, a main housing, a head vertically movable in said housing, a cutter carried by said head, a support adjustable with respect to said housing, a carriage carried by said support movable with respect thereto, a chuck in said carriage, and means for adjusting said support.

81. In a machine of the character described, a housing, a head vertically movable in said housing, a cutter carried by said head, a support vertically adjustable with respect to said housing, a table pivoted to said support, a carriage, a chuck in said carriage, and means for raising and lowering said support.

82. In a machine of the character described, the combination of a cutter, a carriage movable toward and away from said cutter, a chuck operatively supported in said carriage, a power shaft for driving said cutter and said chuck, a loose pulley on said power shaft, a fast pulley on said power shaft, a belt shifter operable to shift the loose pulley from said fast pulley, resilient means for shifting the belt from the fast pulley to the loose pulley, a latch device, and means under the control of the carriage for releasing said latch device permitting said resilient means to shift said belt to stop the operation of the machine.

83. In a machine of the character described, the combination of a pivoted table, a work supporting chuck slidably mounted on the table, power mechanism for revolving the chuck, automatic mechanism for controlling the chuck operating mechanism, a spring actuating the table to one adjustment, an actuator for moving the table to the other adjustment, a cutter spindle, a cutter carried by said spindle, mechanism for raising and lowering the spindle to move the cutter into and out of contact with the work, and mechanism for advancing the chuck on the table to the work.

84. In a machine of the character described, the combination of a table, a support movable with respect to the table, a chuck spindle mounted in said support, a work supporting chuck carried by said chuck spindle, power mechanism for operating said chuck spindle, a cutter spindle, a cutter carried by said spindle, means for raising and lowering said spindle to move the cutter into contact with the work, a device for operating said table to one position, a cam controlled actuator for moving the table to its other adjustment, and means for effecting a longitudinal movement of the cutter spindle in cutting operations.

85. In a machine of the character described, the combination of a frame, with a head vertically movable in said frame, a cutter spindle revolubly mounted in said head, a cutter carried by said spindle, mechanism for operating said spindle, means for raising and lowering said head, a swinging table, a work supporting chuck supported by said table, means for operating the chuck, a spring moving the table to one adjustment, an actuator for moving the table in opposition to said spring, and a cam for operating said actuator.

86. In a machine of the character described, the combination with a frame, of a vertically movable head mounted in the frame, a cutter spindle revolubly mounted in the head, a power shaft, connections between the power shaft and said cutter spindle, a cam, connections between said cam and said power shaft, a spring for actuating said head to depressed position, connections between the cam and head whereby said head may be raised, a device for moving the cutter spindle longitudinally in the head, a work supporting chuck, and mechanism for revolving said chuck at timed intervals and varying distances.

87. In a machine of the character described, the combination of a frame, a vertically movable head mounted in the frame, a cutter spindle carried by said head, a cutter carried by said spindle, power mechanisms for revolving said cutter spindle, a chuck, a support for said chuck, and a power connection for revolving said chuck in contact with the cutter at timed intervals and varying distances.

88. In a machine of the character described, the combination of a stationary support, a power shaft mounted in said support, a vertically movable head mounted in said support, a spindle revolubly carried in said head, a cutter carried by said spindle, driving connections between the power shaft and the spindle, means for raising said head in said support, a carriage, a chuck mounted in said carriage, driving connections for revolving said chuck, means for advancing the chuck to the cutter, power connections with the power shaft for revolving said chuck, and mechanism for controlling said connections to render them operative at timed intervals.

89. In a machine of the character described, the combination with a stationary support, of a vertically movable head mounted in said support, a spindle carried by said head, a power shaft journaled in said support, speed increasing driving connections between the power shaft and the spindle, means for raising and lowering the head of the machine, a work supporting chuck, a support for said chuck movable longitudinally to and away from said spindle, speed reducing driving connections for the chuck from the power shaft for revolving the chuck in the opposite direction from the spindle, and a clutch device for engaging said clutch at timed intervals.

90. In a machine of the character described, the combination with a stationary frame, of a vertically movable head mounted in said frame, a spindle support mounted in said head, a cutter spindle carried by said support, a spring for depressing said head in said support, means for raising said head in opposition to said spring, a spring for holding said spindle support in one adjustment, mechanism operable to move said spindle support longitudinally of its axis in opposition to said spring, and means for supporting work in co-operative relationship with said cutter.

JOHN FLAMMANG.